US011048547B2

(12) United States Patent
 Podluzhny

(10) Patent No.: US 11,048,547 B2
(45) Date of Patent: Jun. 29, 2021

(54) METHOD AND SYSTEM FOR ROUTING AND EXECUTING TRANSACTIONS

(71) Applicant: YANDEX EUROPE AG, Lucerne (CH)

(72) Inventor: Denis Nikolaevich Podluzhny, Syktyvkar (RU)

(73) Assignee: YANDEX EUROPE AG, Lucerne (CH)

( * ) Notice: Subject to any disclaimer, the term of this patent is extended or adjusted under 35 U.S.C. 154(b) by 129 days.

(21) Appl. No.: 16/401,688

(22) Filed: May 2, 2019

(65) Prior Publication Data

US 2020/0110632 A1 Apr. 9, 2020

(30) Foreign Application Priority Data

Oct. 9, 2018 (RU) .......................... RU2018135460

(51) Int. Cl.
 *G06F 9/46* (2006.01)
 *G06F 16/23* (2019.01)
 (Continued)

(52) U.S. Cl.
 CPC ............ *G06F 9/466* (2013.01); *G06F 9/5038* (2013.01); *G06F 16/2322* (2019.01); *G06F 16/254* (2019.01); *G06F 16/278* (2019.01)

(58) Field of Classification Search
 None
 See application file for complete search history.

(56) References Cited

U.S. PATENT DOCUMENTS

| 5,247,677 A | 9/1993 | Welland et al. |
| 5,278,984 A | 1/1994 | Batchelor |

(Continued)

FOREIGN PATENT DOCUMENTS

| CN | 105653365 A | 6/2016 |
| CN | 103514037 B | 6/2018 |

(Continued)

OTHER PUBLICATIONS

Ex Parte Quale Action dated Apr. 23, 2020 received in respect of a related U.S. Appl. No. 16/383,976.

(Continued)

*Primary Examiner* — Abu Zar Ghaffari
(74) *Attorney, Agent, or Firm* — BCF LLP

(57) ABSTRACT

A distributed software system and a method for routing transactions for execution are disclosed. The distributed software system has a database sub-system partitioned into shards and a transaction routing sub-system for ordering transactions. The transaction routing sub-system has a plurality of coordinator ports and a plurality of mediator ports. The coordinator ports receive transactions to be executed by the shards and generate local per-shard orders for the received transactions. The local per-shard orders are received by the plurality of mediator ports which are pre-assigned with respective shards. The mediator ports generate centralized per-shard orders of execution based on the received per-shard orders. A given centralized per-shard order of execution is an order of execution of transactions received by a given mediator port and that are destined to be executed by a given shard that is pre-assigned to the given mediator port.

24 Claims, 7 Drawing Sheets

(51) Int. Cl.
  *G06F 16/25* (2019.01)
  *G06F 9/50* (2006.01)
  *G06F 16/27* (2019.01)

(56) References Cited

U.S. PATENT DOCUMENTS

| | | | |
|---|---|---|---|
| 5,577,202 | A | 11/1996 | Padgett |
| 5,640,563 | A | 6/1997 | Carmon |
| 5,845,316 | A | 12/1998 | Hillyer et al. |
| 6,023,720 | A | 2/2000 | Aref et al. |
| 6,256,755 | B1 | 7/2001 | Hook et al. |
| 6,553,472 | B2 | 4/2003 | Yang et al. |
| 6,757,897 | B1 | 6/2004 | Shi et al. |
| 6,791,992 | B1 | 9/2004 | Yun et al. |
| 6,851,115 | B1 | 2/2005 | Cheyer et al. |
| 6,859,931 | B1 | 2/2005 | Cheyer et al. |
| 7,073,021 | B2 | 7/2006 | Iren et al. |
| 7,177,866 | B2 | 2/2007 | Holenstein et al. |
| 7,474,989 | B1 | 1/2009 | Wilcoxon |
| 7,562,362 | B1 | 7/2009 | Paquette et al. |
| 7,971,093 | B1 | 6/2011 | Goel et al. |
| 8,037,024 | B1 * | 10/2011 | Bozkaya ............ G06F 16/275 707/637 |
| 8,117,621 | B2 | 2/2012 | Singh et al. |
| 8,145,838 | B1 | 3/2012 | Miller et al. |
| 8,254,172 | B1 | 8/2012 | Kan et al. |
| 8,595,302 | B2 | 11/2013 | Krishnamurthi et al. |
| 8,799,913 | B2 | 8/2014 | Yoo et al. |
| 8,826,301 | B2 | 9/2014 | Kim et al. |
| 8,838,539 | B1 | 9/2014 | Ashcraft et al. |
| 8,850,018 | B2 | 9/2014 | Massa et al. |
| 8,850,446 | B2 | 9/2014 | Avni et al. |
| 8,930,954 | B2 | 1/2015 | Hildrum et al. |
| 8,966,490 | B2 | 2/2015 | Avni et al. |
| 9,037,826 | B1 | 5/2015 | Brooker et al. |
| 9,047,331 | B2 | 6/2015 | Rao et al. |
| 9,093,160 | B1 | 7/2015 | Ellis et al. |
| 9,203,900 | B2 | 12/2015 | Rao et al. |
| 9,251,195 | B2 | 2/2016 | Yamada |
| 9,304,694 | B2 | 4/2016 | Colgrove et al. |
| 9,348,592 | B2 | 5/2016 | Jha |
| 9,354,813 | B1 | 5/2016 | Dolan et al. |
| 9,400,682 | B2 | 7/2016 | Persikov et al. |
| 9,477,521 | B2 | 10/2016 | Truong et al. |
| 9,489,443 | B1 * | 11/2016 | Muniswamy-Reddy .................... G06F 16/278 |
| 9,547,528 | B1 | 1/2017 | McClure et al. |
| 9,569,339 | B1 | 2/2017 | Villalobos et al. |
| 9,639,396 | B2 | 5/2017 | Pho et al. |
| 9,699,017 | B1 | 7/2017 | Gupta et al. |
| 9,811,391 | B1 | 11/2017 | Barrett |
| 9,921,557 | B2 | 3/2018 | Slupik et al. |
| 10,552,215 | B1 | 2/2020 | Xu et al. |
| 10,572,323 | B1 | 2/2020 | Zhai et al. |
| 2002/0099756 | A1 | 7/2002 | Catthoor et al. |
| 2003/0115410 | A1 | 6/2003 | Shriver |
| 2004/0213387 | A1 | 10/2004 | Chandrasekaran |
| 2005/0047425 | A1 | 3/2005 | Liu et al. |
| 2007/0002750 | A1 | 1/2007 | Sang et al. |
| 2007/0226332 | A1 | 9/2007 | Becker-Szendy et al. |
| 2007/0268516 | A1 | 11/2007 | Bugwadia et al. |
| 2007/0282660 | A1 | 12/2007 | Forth et al. |
| 2008/0049633 | A1 | 2/2008 | Edwards et al. |
| 2008/0168452 | A1 | 7/2008 | Molaro et al. |
| 2008/0320482 | A1 | 12/2008 | Dawson et al. |
| 2009/0013154 | A1 | 1/2009 | Du et al. |
| 2009/0292744 | A1 | 11/2009 | Matsumura |
| 2009/0300449 | A1 | 12/2009 | Qian et al. |
| 2010/0011182 | A1 | 1/2010 | Le Moal et al. |
| 2010/0035581 | A1 | 2/2010 | Park et al. |
| 2010/0185847 | A1 | 7/2010 | Shasha et al. |
| 2011/0145830 | A1 | 6/2011 | Yamaguchi |
| 2011/0153566 | A1 | 6/2011 | Larson et al. |
| 2011/0196834 | A1 * | 8/2011 | Kesselman ............ G06F 16/27 707/634 |
| 2011/0219100 | A1 | 9/2011 | Dhuse et al. |
| 2011/0261698 | A1 | 10/2011 | Kamerkar et al. |
| 2011/0314070 | A1 | 12/2011 | Brown et al. |
| 2012/0046807 | A1 | 2/2012 | Ruther et al. |
| 2012/0047317 | A1 | 2/2012 | Yoon et al. |
| 2012/0066449 | A1 | 3/2012 | Colgrove et al. |
| 2012/0124273 | A1 | 5/2012 | Goss et al. |
| 2012/0204265 | A1 | 8/2012 | Judge |
| 2012/0278801 | A1 | 11/2012 | Nelson et al. |
| 2013/0042156 | A1 | 2/2013 | Srinivasan et al. |
| 2013/0132057 | A1 | 5/2013 | Deng et al. |
| 2013/0191836 | A1 | 7/2013 | Meyer |
| 2013/0227186 | A1 * | 8/2013 | Laughton ............ G06F 13/362 710/113 |
| 2013/0326161 | A1 | 12/2013 | Cohen et al. |
| 2014/0019987 | A1 | 1/2014 | Verma et al. |
| 2014/0074623 | A1 | 3/2014 | Mohammadi et al. |
| 2014/0157276 | A1 * | 6/2014 | Smithson ................ G06F 9/466 718/101 |
| 2014/0208327 | A1 | 7/2014 | Cadambi et al. |
| 2014/0226565 | A1 | 8/2014 | Velev et al. |
| 2014/0250438 | A1 | 9/2014 | Shin et al. |
| 2014/0282572 | A1 | 9/2014 | Kang |
| 2014/0304601 | A1 | 10/2014 | Rossano et al. |
| 2015/0127625 | A1 * | 5/2015 | Bulkowski ............ G06F 16/27 707/703 |
| 2015/0128149 | A1 | 5/2015 | Meijer et al. |
| 2015/0237157 | A1 * | 8/2015 | Wang .................. H04L 41/0668 714/4.11 |
| 2015/0347185 | A1 | 12/2015 | Holt et al. |
| 2015/0347211 | A1 | 12/2015 | Dang et al. |
| 2015/0347554 | A1 * | 12/2015 | Vasantham ......... G06F 16/2246 707/622 |
| 2016/0149964 | A1 | 5/2016 | Pastro |
| 2016/0188376 | A1 | 6/2016 | Rosas |
| 2016/0266934 | A1 | 9/2016 | Rimoni |
| 2016/0291885 | A1 | 10/2016 | Pendharkar et al. |
| 2017/0017676 | A1 | 1/2017 | Levy et al. |
| 2017/0031713 | A1 | 2/2017 | Campbell et al. |
| 2017/0048021 | A1 | 2/2017 | Yanovsky et al. |
| 2017/0109203 | A1 | 4/2017 | Liu et al. |
| 2017/0147488 | A1 | 5/2017 | Vaquero |
| 2017/0177697 | A1 | 6/2017 | Lee et al. |
| 2017/0308403 | A1 | 10/2017 | Turull et al. |
| 2017/0374516 | A1 | 12/2017 | Huo et al. |
| 2018/0006999 | A1 | 1/2018 | Doukhvalov et al. |
| 2018/0041477 | A1 | 2/2018 | Shaposhnik |
| 2018/0052710 | A1 | 2/2018 | Choi et al. |
| 2018/0101448 | A1 | 4/2018 | Ventura et al. |
| 2018/0114290 | A1 | 4/2018 | Paltashev et al. |
| 2018/0157543 | A1 | 6/2018 | Bellomo et al. |
| 2018/0260125 | A1 | 9/2018 | Botes et al. |
| 2018/0293123 | A1 | 10/2018 | Kondapalli et al. |
| 2018/0300385 | A1 * | 10/2018 | Merriman ............ G06F 16/278 |
| 2019/0163546 | A1 | 5/2019 | Ungar et al. |
| 2019/0171763 | A1 * | 6/2019 | Cai ....................... G06F 16/951 |
| 2019/0199515 | A1 * | 6/2019 | Carver ................. G06F 16/275 |
| 2019/0392061 | A1 * | 12/2019 | Terry .................. G06F 16/2379 |
| 2020/0074416 | A1 * | 3/2020 | Mathew ................. G06Q 20/10 |
| 2020/0252761 | A1 | 8/2020 | Podluzhny |

FOREIGN PATENT DOCUMENTS

| | | |
|---|---|---|
| EA | 031078 B1 | 11/2018 |
| EP | 2110990 A1 | 10/2009 |
| EP | 1508850 A3 | 3/2015 |
| GB | 2351375 A | 12/2000 |
| RU | 2273105 C2 | 3/2006 |
| RU | 2376635 C2 | 12/2009 |
| RU | 2388039 C2 | 4/2010 |
| RU | 2494453 C2 | 9/2013 |
| RU | 2533638 C2 | 11/2014 |
| RU | 2543558 C2 | 3/2015 |
| RU | 2547705 C2 | 4/2015 |
| RU | 2581551 C2 | 4/2016 |
| RU | 2628146 C2 | 8/2017 |
| RU | 2649788 C1 | 4/2018 |
| RU | 2665212 C2 | 8/2018 |

(56) References Cited

FOREIGN PATENT DOCUMENTS

| RU | 2670573 C2 | 10/2018 |
| WO | 2012065018 A2 | 5/2012 |
| WO | 2016197716 A1 | 12/2016 |

OTHER PUBLICATIONS

Ex Parte Quale Action dated Oct. 22, 2020 received in respect of a related U.S. Appl. No. 16/560,409.
Office Action dated Oct. 23, 2020 received in respect of a related U.S. Appl. No. 16/504,040.
Notice of Allowance dated Oct. 15, 2020 received in respect of a related U.S. Appl. No. 16/433,186.
Grefen et al. "Two-Layer Transaction Management for Workflow Management Applications", Database and Expert Systems Applications, pp. 430-439, publication date: Sep. 1997430-439.
"Deadline scheduler", retrieved on Wikipedia on Jan. 21, 2019.
"Shortest seek first", retrieved on Wikipedia on Jan. 21, 2019.
"Elevator algorithm", retrieved on Wikipedia on Jan. 21, 2019.
Abeni et al, "Constant Bandwidth Server Revisited", EWiLi'14, Nov. 2014, Lisbon, Portugal.
Virtuozzo Storage 2.3, Installation Guide, Dec. 14, 2017, retrieved from docs.virtuozzo.com/virtuozzo_storage_2_installation_guide/planning-virtuozzo-storage-infrastructure/understanding-data-redundancy.html.
Kumar et al, "Optimized Particle Swarm Optimization Based Deadline Constrained Task Scheduling in Hybrid Cloud", Ictact Journal of Soft Computing, Jan. 2016, Vlume 06, Issue 02, pp. 1117-1122 (Year: 2016).
Shin et al, "Deadline-Guaranteed Scheduling Algorithm with Improved Resource Utilization for Cloud Computing", 12th Annual IEEE Consumer Communications and Networking Conference (CCNC), 2015, pp. 814-819 (Year: 2015).
Chopra et al, "Deadline and Cost based Workflow Scheduling in Hybrid Cloud", 2013, IEEE, pp. 840-846 (Year: 2013).
Yuan et al, "Deadline divison-based heuristic for cost optimization in workflow scheduling". Information Sciences 179 (2009) 2562-2575, Elsevier, pp. 2562-2575 (Year: 2009).
Srinivasan et al, "Deadline-based scheduling of periodic task systems on multiprocessors", Information Processing Letters 84 (2002), 93-98, Elsevier, pp. 93-98 (Year: 2002).
Ruemmier "An Introduction to Disk Drive Modeling", Hewlett Packard Laboratories, IEEE, Mar. 1994, pp. 17-29 (Year 1994).
IEEE 100, The Authoritative Dictionary of IEEE Standards Terms, Seventh Edition, IEEE Press, 2000, pp. 245, 1184 (Year: 2000).
Office Action dated Nov. 12, 2020 received in respect of a related U.S. Appl. No. 16/367,537.
Office Action dated Nov. 20, 2020 received in respect of a related U.S. Appl. No. 16/776,011.
Russian Search Report dated Oct. 30, 2019 issued in respect of the Russian Patent Application No. RU2018136221.
Russian Search Report dated Jan. 18, 2021 issued in respect of the Russian Patent Application No. RU2019103253.
Notice of Allowance dated Mar. 23, 2021 received in respect of a related U.S. Appl. No. 16/574,277.
Office Action dated Jan. 1, 2021 received in respect of a related U.S. Appl. No. 16/384,301.
Office Action dated Mar. 10, 2021 received in respect of a related U.S. Appl. No. 16/367,537.

* cited by examiner

METHOD AND SYSTEM FOR ROUTING AND EXECUTING TRANSACTIONS

CROSS-REFERENCE

The present application claims priority from Russian Patent Application No. 2018135460, entitled "Method and System for Routing and Executing Transactions," filed Oct. 9, 2018, the entirety of which is incorporated herein by reference.

FIELD

The present technology relates to distributed database systems and, specifically, to a method and system for routing and executing transactions by a distributed database system.

BACKGROUND

Storage requirements for storing digital data are continuously increasing due to the large volume of digital data that is being created everyday. For example, various types of user data, organization data and/or application data may need to be stored. This increases the demand for data storage capacity. Cloud storage systems may provide data storage capacity to users and/or organizations in order to cope with these increasing storage capacity requirements.

Generally speaking, cloud storage is a model of computer storage in which the digital data is stored in logical pools. The physical storage, where the digital data is actually stored, spans multiple servers, possibly located in different locations (i.e. different data centers), and is typically managed by a company hosting cloud storage services. Users and/or organizations usually buy or lease storage capacity from cloud storage service providers in order to store their digital data. In return, cloud storage service providers are responsible for keeping the digital data available and accessible while ensuring that the physical storage is protected for avoiding data loss.

The physical storage of a cloud storage service provider, in some cases, hosts a distributed database that is configured to acquire transactions for inputting/outputting digital data. A given transaction can be seen as a unit of work (i.e. a "task") to be performed by the distributed database and that potentially represents a change in the state of the distributed database. For example, a given transaction may be a specific intended run of a computer program that accesses a database and provides data retrieval and/or data update capabilities for operators of the distributed database.

It is known that, in some particular instances, transactions may need to be executed in a specific order (e.g., be serialized) for ensuring correct operation of distributed database systems. In order to ensure this specific order, a distributed database system typically comprises a transaction management system that manages transactions destined to the database.

SUMMARY

Developers of the present technology have appreciated certain technical drawbacks associated with transaction management in distributed database systems.

For example, some conventional distributed database systems implement a single transaction management system, or a "single transaction manager", for short. This results in a single "point-of-entry" for transactions into the distributed database system. In other words, this single transaction manager is configured to receive all of the transactions destined to the distributed database system. The developers of the present technology have realized that implementing such a single "point-of-entry" transaction manager may impede the scalability of the distributed database systems. In other words, a single "point-of-entry" transaction manager may be problematic when the distributed database system is composed of a large number of database shards.

When the distributed database system is composed of a small number of shards, using a single "point-of-entry" transaction manager may be a satisfactory approach. However, when the distributed database system is composed of a large number of shards, using a single "point-of-entry" transaction manager becomes less efficient since a global transaction scheme, which is used for globally ordering the transactions destined to the distributed database system, may cause the shards to exchange information amongst each other. As a result, if the number of shards in the distributed database system is large, the informational exchange amongst the shards increases and, in turn, may increase the latency in the distributed database system.

Furthermore, the developers of the present technology have also realized that a single "point-of-entry" transaction manager causes what is known as a "bottle neck" effect in the distributed database systems. This may be problematic when a large number of transactions are directed to this single "point-of-entry" for ordering.

Additionally, the developers of the present technology have also realized that implementing more than one conventional transaction managers for managing transactions destined to the distributed database system, and thereby avoiding the "bottle neck" effect, may not be an ideal solution. If more than one conventional transaction managers are used for a distributed database system, they may need to be synchronized amongst each other for providing a global transaction scheme. Synchronization amongst transaction managers is computationally expensive and requires additional computational resources.

It is an object of the present technology to ameliorate at least some of the inconveniences present in the prior art.

In some embodiments of the present technology, the developers of the present technology have devised inter alia a "multi-entry" transaction routing system. This "multi-entry" transaction routing system may be implemented as part of a distributed software-based system that is configured for routing and executing transactions in the distributed database system.

In accordance with some embodiments of the present technology, the "multi-entry" transaction routing system includes (i) a layer of "coordinator ports" configured to, broadly speaking, provide more than one "point-of-entry" for the transactions destined to the distributed database system, and (ii) a layer of "mediator ports" configured to ensure that transactions destined to respective shards of the distributed database system are properly ordered for execution.

In some embodiments, this "multi-entry" transaction routing system may facilitate scalability of distributed database systems and, therefore, can be designed for distributed database systems that are composed of a large number of shards while reducing the latency in the distributed database system, if compared to some conventional transaction management systems.

In other embodiments, this "multi-entry" transaction routing system may not require synchronization (i) amongst coordinator ports, and (ii) amongst mediator ports. As a result, implementation of this "multi-entry" transaction routing system may reduce computational resource requirements, if compared to some conventional transaction managing systems where synchronization is required.

It is contemplated that in some embodiments of the present technology, using this "multi-entry" transaction routing system may be beneficial for at least one of the following reasons:
  each coordinator port receives a respective set of transactions and, thus, the "bottle neck" effect of some conventional transaction management systems may be avoided;
  coordinator ports may not be required to communicate amongst each other or may not be required to be synchronized and, thus, the computational resource requirement of the transaction routing system may be reduced;
  once transactions are received and ordered by the respective coordinator ports, they are transmitted to particular mediator ports that also may not be required to communicate amongst each other or may not be required to be synchronized and, thus, the computational resource requirement of the transaction routing system may be reduced;
  once the transactions are received and ordered by the respective mediator ports, they are transmitted to only those shards to which the transactions are actually directed to and, therefore:
    i. the need to compute a global transaction scheme encompassing all the transactions may be avoided;
    ii. the need to send this global transaction scheme to each and every shard of the distributed database system may be avoided;
    iii. only a portion of shards of the distributed database system may need to be accessed; and/or
    iv. the shards that are accessed receive only an order of transactions that are directed to them in particular and, thus, may not require receiving a global transaction scheme with an order of all transactions destined to the distributed database system.

As a result, it is contemplated that in some embodiments of the present technology, using such a "multi-entry" transaction routing system may allow, for example: minimizing an amount of informational exchange within the distributed software system that routes and executes the transactions, minimizing CPU usage for supporting the distributed software system, and avoiding unnecessary accessing of shards of the distributed database system that are not targeted by the transactions.

In accordance with a first broad aspect of the present technology, there is provided a distributed software system for routing transactions for execution. The transactions are generated from a request provided by a request source. The distributed software system comprises a database sub-system which has a plurality of transaction destination locations and is partitioned into a plurality of shards. Each shard of the plurality of shards comprises a respective portion of the plurality of transaction destination locations. The distributed software system also comprises a transaction routing sub-system for ordering a plurality of transactions. Each one of the plurality of transactions having a respective transaction-unique identifier (TUID) and is destined to at least one respective transaction destination location for execution. The transaction routing sub-system has a plurality of coordinator ports. Each one of the plurality of coordinator ports is associated with a respective counter. A given one of the plurality of coordinator ports is configured to receive a respective set of transactions. Each one of the respective set of transactions has the respective TUID and is associated with the at least one respective transaction destination location for execution. A given one of the plurality of coordinator ports is also configured to, for a given shard including at least one transaction destination location associated with the respective set of transactions, determine a local per-shard order of a subset of the set of transactions. Transactions of the subset are destined to the at least one transaction destination location of the given shard. The local per-shard order is based on the respective TUIDs of the transactions in the subset of the set of transactions. A given local per-shard order of the subset of the set of transactions is indicative of an order in which transactions in the subset of the set of transactions are to be executed by the given shard. The transaction routing sub-system also has a plurality of mediator ports. Each one of the plurality of mediator ports having been pre-assigned to at least one shard. A given one of the plurality of mediator ports is configured to receive the local per-shard orders from the plurality of coordinator ports. Received local per-shard orders are associated with the at least one shard to which the given one of the plurality of mediator ports is pre-assigned. A given one of the plurality of mediator ports is also configured to determine a centralized per-shard order for the at least one pre-assigned shard by organizing the respective local per-shard orders associated with the at least one pre-assigned shard based on the counters of the plurality of coordinator ports of the received respective local per-shard orders. A given centralized per-shard order is indicative of an order in which all transactions destined to the transactions destination locations of a respective shard and received by the respective mediator port are to be executed by the respective shard.

In some implementations of the present technology, each of the plurality of coordinator ports and each of the plurality of mediator ports is executed as a software module.

In some implementations of the present technology, the software module is executed as a State Machine (SM).

In some implementations of the present technology, each shard of the plurality of shards is pre-assigned to a single mediator port from the plurality of mediator ports.

In some implementations of the present technology, a given mediator port from the plurality of mediator port is pre-assigned with more than one shards from the plurality of shards.

In some implementations of the present technology, a given mediator port from the plurality of mediator ports is implemented as part of the respectively pre-assigned shard.

In some implementations of the present technology, a given one of the plurality of coordinator ports is configured to send an empty coordinator packet to those ones of the plurality of mediator ports for which the given one of the plurality of coordinator ports has not received transactions.

In some implementations of the present technology, a number of the plurality of coordinator ports is smaller than a number of the plurality of mediator ports.

In some implementations of the present technology, the number of plurality of mediator ports is smaller than a number of the plurality of shards.

In some implementations of the present technology, the database sub-system hosts a database.

In some implementations of the present technology, the database is a distributed database and stored in a distributed storage sub-system.

In some implementations of the present technology, the database has one or more database tables.

In some implementations of the present technology, the one or more database tables are split amongst the plurality of shards.

In accordance with a second broad aspect of the present technology, there is provided a method for routing transactions for execution. The method is executable by a distributed software system. The distributed software system comprises a database sub-system that comprises a plurality of transaction destination locations and is partitioned into a plurality of shards. Each shard of the plurality of shards comprises a respective portion of the plurality of transaction destination locations. The distributed software system also comprises a transaction routing sub-system for ordering a plurality of transactions. Each one of the plurality of transactions having a respective transaction-unique identifier (TUID) and is destined to at least one respective transaction destination location for execution. The transaction routing sub-system has a plurality of coordinator ports and a plurality of mediator ports. Each one of the plurality of mediator ports is pre-assigned with at least one respective shard from the plurality of shards. The method comprises receiving, by a given coordinator port, a respective set of transactions. Each transaction has a respective TUID and is associated with the at least one respective transaction destination location for execution. The method comprises generating, by the given coordinator port, at least one local per-shard order based on the TUIDs and the at least one respective transaction destination location of the transactions in the respective set of transactions. A given one of the at least one local per-shard order comprises transactions from the respective set of transactions that are destined to transaction destination locations of a given shard from the plurality of shards. The method comprises transmitting, by the given coordinator port, the at least one local per-shard order to a respective mediator port that is pre-assigned to the given shard from the plurality of shards. The method comprises receiving, by a given mediator port, at least one local per-shard order from the plurality of coordinator ports. Each one of the at least one local per-shard order received by the given mediator port is associated with an coordinator identifier (CID) of the respective coordinator port and with a counter of the respective coordinator port. The method comprises generating, by the given mediator port, at least one centralized per-shard order of execution from the at least one local per-shard order received from the plurality of coordinator ports and based on the respective CIDs and the respective counters, the at least one centralized per-shard order of execution is destined to a respective pre-assigned shard of the given mediator port.

In some implementations of the present technology, the method further comprises executing, by the respective pre-assigned shard of the given mediator port, transactions referenced in the respective centralized per-shard order of execution.

In some implementations of the present technology, prior to the generating the at least one centralized per-shard order of execution, the method further comprises verifying, by the given mediator port, that a coordinator packet has been received from each one of the plurality of coordinator ports.

In some implementations of the present technology, the generating the at least one local per-shard order by the given coordinator port comprises: ordering, by the given coordinator port, the respective set of transactions thereby generating a respective ordered set of transactions.

In some implementations of the present technology, the ordering comprises applying an ordering algorithm to the respective TUIDs.

In some implementations of the present technology, a number of the plurality of coordinator ports is smaller than a number of the plurality of mediator ports.

In some implementations of the present technology, the number of plurality of mediator ports is smaller than a number of the plurality of shards.

In some implementations of the present technology, the database sub-system hosts a database.

In some implementations of the present technology, the database is a distributed database and stored in a distributed storage sub-system.

In some implementations of the present technology, the database has one or more database tables.

In some implementations of the present technology, the one or more database tables are split amongst the plurality of shards.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present detailed description is intended to be only a description of illustrative examples of the present technology. This description is not intended to define the scope nor set forth the bounds of the present technology. In some cases, helpful examples of modifications may be set forth as an aid to understanding the present technology, and not to define the scope or set forth the bounds of the present technology. These modifications are not an exhaustive list and other modifications are likely possible.

Further, where this has not been done (i.e. where no examples of modifications have been set forth), it should not be interpreted that no modifications are possible and/or that what is described is the sole manner of implementing that particular aspect of the present technology. In addition it is to be understood that the present detailed description provides in certain instances simple implementations of the present technology, and that where such is the case they have been presented in this manner as an aid to understanding. Various implementations of the present technology may be of a greater complexity.

Figure 1:
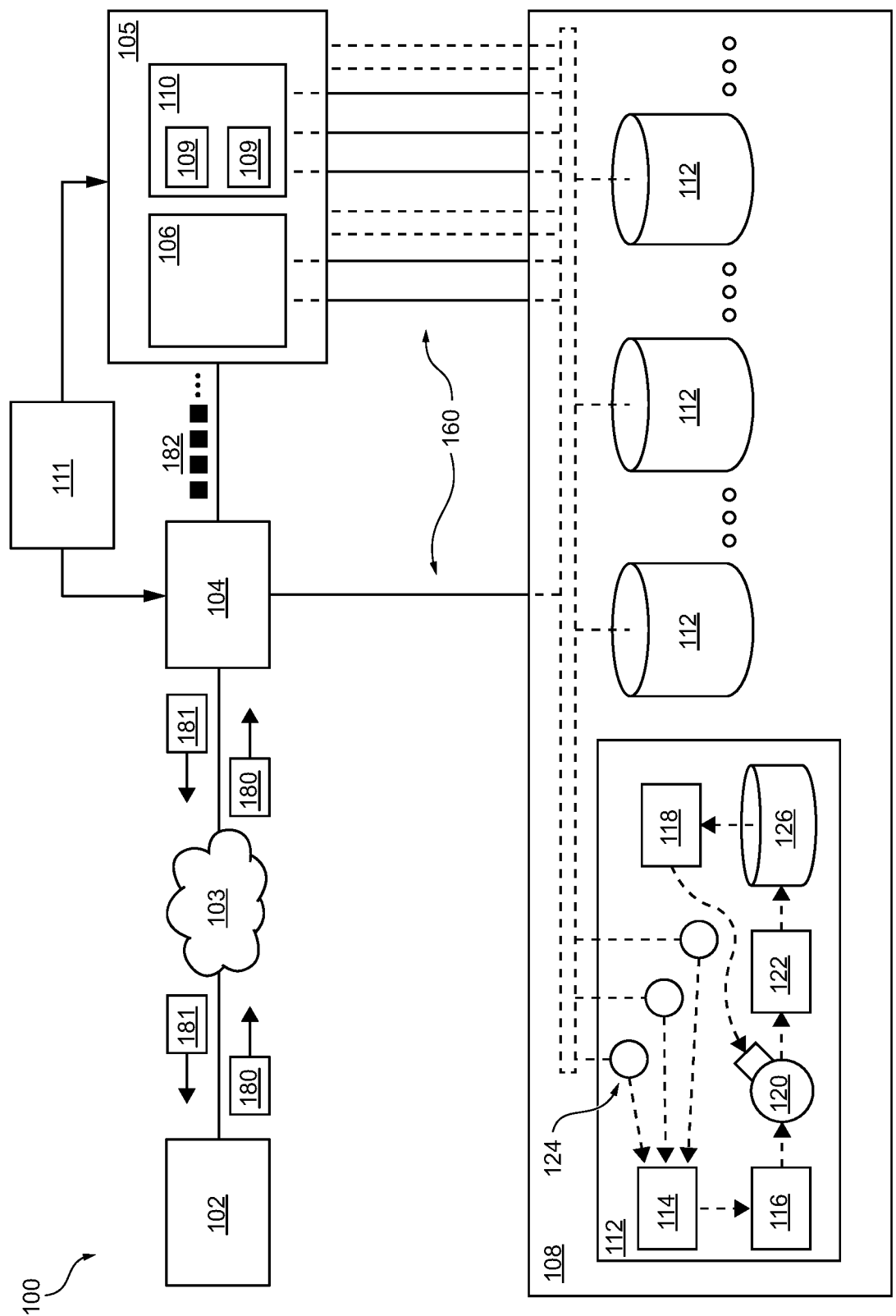
FIG. 1 depicts a system suitable for implementing non-limiting embodiments of the present technology.

Referring to FIG. 1, there is depicted a distributed computer-processing system 100 or a "distributed processing system" 100, for short. The distributed processing system 100 is configured for implementing non-limiting embodiments of the present technology. It is to be expressly understood that the distributed processing system 100 as depicted is merely an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the distributed processing system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the distributed processing system 100 may provide in certain instances simple implementations of the present technology, and that where such is the case they have been presented in this manner as an aid to understanding. As persons skilled in the art would understand, various implementations of the present technology may be of a greater complexity.

The distributed processing system 100 comprises a request source 102, a communication network 103, a request pre-processing sub-system 104, a transaction processing sub-system 105, a transaction routing sub-system 106, a distributed storage sub-system 108, a database sub-system 110, and an operational sub-system 111.

How the above listed components of the distributed processing system 100 are implemented in accordance to the various non-limiting embodiments of the present technology will now be described.

Request Source

The request source 102 may be an electronic device associated with an end user (e.g., a client device) or, alternatively, any other sub-system of the distributed processing system 100 that is configured to provide user requests for the distributed processing system 100. It should be expressly understood that even though FIG. 1 depicts only a single instance of the request source 102, the distributed processing system 100 may have multiple instances of the request source 102. As illustrated herein, the request source 102 is part of the distributed processing system 100, however, in some embodiments of the present technology, the request source 102 may be external to the distributed processing system 100, and connected via a communication link (not numbered).

In fact, a typical implementation of the distributed processing system 100 can include a large number of request sources 102, such as hundred instances, thousand instances, million instances, and the like.

In some embodiments of the present technology, where the distributed processing system 100 is employed in a business-to-customer (B2C) environment, the request source 102 may be a given client device, such as a smartphone, for example, associated with a given user of the distributed processing system 100. For example, the distributed processing system 100 may potentially provide cloud storage services for the given client device of the given user.

In other embodiments of the present technology, where the distributed processing system 100 is employed in a business-to-business (B2B) environment, the request source 102 may be a given sub-system, such as a remote server, for example, providing user requests to the distributed processing system 100. For example, in some embodiments of the present technology, the distributed processing system 100 may provide fault-tolerant data processing and/or storage services for an operator of the given sub-system.

Broadly speaking, irrespective of whether the distributed processing system 100 is implemented as a B2C or a B2B system (or any other variation of the system for that matter), the request source 102 may be a given client device or another sub-system which can be internal or external to the distributed processing system 100.

As mentioned above, the request source 102 is configured to issue a plurality of requests 180, each of which will be referred herein below as the request 180. The nature of the request 180 will depend on a type of the request source 102. However, one example of the request 180 is a query expressed in Structured Query Language (SQL). Therefore, it is contemplated that in some embodiments of the present technology, the request 180 may be expressed in a declarative programming language, which means that the request 180 may be a declarative-type request.

Generally speaking, declarative programming is a style of building a structure and elements of computer programs that expresses the logic of a computation without describing a control flow thereof. Common declarative programming languages include, but are not limited to, SQL, XQuery and other database query languages. Broadly speaking, a declarative-type request is one that specifies an action in terms of "what" needs to be executed, as opposed to how "how" it needs to be executed.

This means that a given declarative-type request may be associated with a given condition under which a given action should be executed. The given condition may be, for example, a condition on which entity the given action is to be executed or where to obtain values for the given action to be executed.

As non-limiting examples, the given declarative-type request can be formulated such as: "Upsert a value of 5 in a cell associated with a key that is equal to a value of a cell associated with a key A" and "For all keys associated with a cell having a value of 5, replace that value with a value 10". However, it should be understood that examples of declarative languages and examples of declarative-type requests have been provided above for ease of illustration only, and that other declarative languages and other declarative-type requests may be used by the request source 102, without departing from the scope of the present technology.

In some embodiments of the present technology, the request source 102 is also configured to receive a plurality of responses 181, each of which will be referred herein below as the response 181. Generally speaking, in response to the request 180 being processed (or potentially not processed) by the distributed processing system 100, the distributed processing system 100 may generate the response 181 destined to the request source 102 associated with the respective request 180. The nature of the response 181 will depend on inter alia a type of the request source 102, the type of the respective request 180 and whether the distributed processing system 100 processed (or potentially not processed) the respective request 180. In some embodiments of the present technology, the distributed processing system 100 may generate the response 181 only in case of a failure to process the request, only in case of a successful processing of the request, or both.

In one example, during processing of the request 180, the distributed processing system 100 may be configured to request additional data from the request source 102 for continuing or completing processing of the request 180. In such a case, the distributed processing system 100 may be configured to generate the response 181 in a form of a data-request message being indicative of additional data requested by the distributed processing system 100 for continuing or completing the processing of the request 180.

In another example, if the distributed processing system 100 successfully processed the respective request 180, the distributed processing system 100 may be configured to generate the response 181 in a form of a success message being indicative of successful processing of the respective request 180.

In a further example, if the distributed processing system 100 failed to successfully process the respective request 180, the distributed processing system 100 may be configured to generate the response 181 in a form of a failure message being indicative of failed processing of the respective request 180. In such a case, the request source 102 may be configured to perform additional actions such as, but not limited to, re-issuing the request 180, performing diagnostic analyzes for identifying the reason of failed processing of the request 180 by the distributed processing system 100, issuing a new request destined to the distributed processing system 100, and the like.

Communication Network

The request source 102 is communicatively coupled to the communication network 103 for providing the request 180 to the distributed processing system 100 and for receiving the response 181 from the distributed processing system 100. In some non-limiting embodiments of the present technology, the communication network 103 can be implemented as the Internet. In other non-limiting embodiments of the present technology, the communication network 103 can be implemented differently, such as any wide-area communication network, local-area communication network, a private communication network and the like. How a communication link (not separately numbered) between the request source 102 and the communication network 103 is implemented will depend on inter alia how the request source 102 is implemented.

Merely as an example and not as a limitation, in those embodiments of the present technology where the request source 102 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the request source 102 is implemented as a remote server, the communication link can be either wireless (such as Wireless Fidelity, or WiFi® for short, Bluetooth® or the like) or wired (such as an Ethernet based connection).

It should be noted that the communication network 103 is configured to transmit inter alia a request data-packet comprising the request 180 from the request source 102 to the request pre-processing sub-system 104 of the distributed processing system 100. For example, this request data-packet may comprise computer-executable instructions written in a given declarative-type programming language which represent the request 180. The communication network 103 is also configured to transmit inter alia a response data-packet comprising the response 181 from the distributed processing system 100 to the request source 102. For example, this response data-packet may comprise computer-executable instructions representing the response 181.

However, it is contemplated that, in some embodiments of the present technology, where the request source 102 is a given sub-system of the distributed processing system 100, for example, the communication network 103 may be implemented in a different manner from what is described above or, in some cases, may even be omitted, without departing from the scope of the present technology.

Operational Sub-System (Hive)

As mentioned above, the distributed processing system 100 comprises the operational sub-system 111, or simply "the hive", for short. Generally speaking, the hive 111 is a given software-based application (for example, a state machine) that is configured to manage at least some sub-systems of the distributed processing system 100, such as the request pre-processing sub-system 104, and the transaction processing sub-system 105, for example. It can be said that the hive 111 may be embodied as a given State Machine (SM) that is configured to generate, delete and/or balance load of other SMs forming the at least some sub-systems of the distributed processing system 100.

It should be understood that a given SM is a computational model employed by computer systems and which is defined by a list of "states". The given SM may change its current state in response to some external input and may be in exactly one state at any given moment in time. A change from a given state to another state of the given SM is called a "state transition".

It should be noted that, in the context of the present technology, the SMs forming the at least some sub-systems of the distributed processing system 100 are deterministic in nature, that is, each state transition of each such SM is uniquely determined by (i) a current state of a respective SM and (ii) a given external input provided to the respective SM. In other words, for a given current state of the respective SM and for a given external input, there is a unique next state of the respective SM. This deterministic nature of the state transition is true irrespective of which SM of the distributed processing system 100 is undergoing the state transition.

Therefore, as it will be described further below, in some embodiments of the present technology, the distributed processing system 100 may need to receive external inputs of a particular type that satisfy this deterministic property of the SMs of the at least some sub-systems of the distributed processing system 100.

Distributed Storage Sub-System

As mentioned above, the distributed processing system 100 also comprises the distributed storage sub-system 108. Generally speaking, the distributed storage sub-system 108 is configured to inter alia store "system data" indicative of states, state transitions, external inputs and/or outputs of at least some of the SMs of the distributed processing system 100. For example, the system data associated with a given SM of the distributed processing system 100 may be stored in a form of a log, and where the log is indicative of a historical listing of states, state transitions, external inputs and/or outputs of the given SM.

The distributed storage sub-system 108 is also configured to store "client data"—i.e. data associated with the processed external inputs by the distributed processing system 100. For example, in some embodiments of the present technology, client data may be stored as part of the system data in the distributed storage sub-system 108 without departing from the scope of the present technology.

In order to store the system data and/or the client data, the distributed storage sub-system 108 comprises a plurality of storage devices 112, each of which will be referred herein below as the storage device 112. In accordance with the various embodiments of the present technology, some or all of the plurality of storage devices 112 can be located in a single location or distributed amongst different locations. For example, some or all of the plurality of storage devices 112 can be located in a single server rack and/or a single data center and/or distributed over a plurality of server racks in one or more data centers.

In some embodiments of the present technology, the system data and/or the client data stored by a given storage device 112 may be replicated and stored on more than one other storage devices 112. In these embodiments, such replication and storing of the system data and/or the client data may result in a fault-tolerant storage of the system data and/or the client data by the distributed processing system 100. Fault-tolerant storage of the system data and/or the client data may allow preventing data loss in cases where a given storage device 112 of the distributed storage sub-system 108 becomes, temporarily or permanently, unavailable for storage and data retrieval purposes. Also, this fault-tolerant storage of the system data and/or the client data may allow preventing data loss in cases where a given SM of the distributed processing system 100 becomes, temporarily or permanently, unavailable.

It is contemplated that the storage device 112 may be implemented as a computer server. The computer server comprises at least one physical memory device (i.e. a memory drive 126) and hosts one or more software applications configured to execute computer-readable instructions. The memory drive 126 can be executed as solid state drive (SSD), hard disk drive (HDD), or the like. Therefore, it can be said that the at least one physical memory device can be implemented as either a movable disk type device or a immovable (static) disk type device.

For example, as depicted in FIG. 1, a given storage device 112 may be configured to host software applications, such as, but not limited to: (i) a virtual-drive (Vdrive) application 114, a physical-drive (Pdrive) application 115, at least one drive model application 118, at least one operation scheduling application 120, a real-time operation enforcing application 122, and at least one SM proxy 124. Functionalities of the above listed software applications and of the memory drive 126 for storing at least some system data and/or the client data will be described in greater detail further below with reference to FIG. 2.

Request Pre-Processing Sub-System

As previously alluded to, the transaction processing sub-system 105 may be formed by a number of deterministic SMs that require receiving external inputs of a particular type and which satisfy the deterministic property of the deterministic SMs. It should also be recalled that the request source 102 issues the request 180 in a form of a declarative-type request.

As such, the request pre-processing sub-system 104 is configured to receive the request 180, which is the declarative-type request originated from the request source 102, and to pre-process/translate the request 180 into a plurality of deterministic transactions 182 that satisfy the deterministic property of the number of deterministic SMs forming the transaction processing sub-system 105.

Therefore, broadly speaking, the purpose of the request pre-processing sub-system 104 is to ensure that the transaction processing sub-system 105 is able to process the request 180 by pre-processing/translating the request 180 into a plurality of transactions that are processable by the deterministic SMs of the transaction processing sub-system 105.

It should be noted that the request pre-processing sub-system 104 is also configured to generate the response 181 to be transmitted to the request source 102. Indeed, the request pre-processing sub-system 104 is communicatively coupled to the transaction processing sub-system 105, not only to transmit thereto the plurality of deterministic transactions 182, but also to receive therefrom information regarding processing of the plurality of deterministic transaction 182. In some of the non-limiting embodiments of the present technology, the plurality of deterministic transactions 182 can be of one or more of any of a "write" type and a "read" type.

In some embodiments of the present technology, the request pre-processing sub-system 104 is implemented as at least one SM, without departing from the scope of the present technology.

In some embodiments of the present technology, it is contemplated that the distributed computer-processing system 100 of FIG. 1 may support ACID transactions. Broadly speaking, ACID (atomicity, consistency, isolation and durability) is an acronym for a set of transaction properties which are directed to maintain database reliability when transactions are executed. Therefore, in some embodiments of the present technology, it is contemplated that transactions destined to the transaction processing sub-system 105 may be atomical, consistent, isolated and durable, without departing from the scope of the present technology.

Transaction Processing Sub-System

Generally speaking, the transaction processing sub-system 105 is configured to receive and process the plurality of deterministic transactions 182, thereby processing the request 180 of the request source 102. The transaction processing sub-system 105 includes (i) the transaction routing sub-system 106 and (ii) the database sub-system 110, which will now be described in turn.

The database sub-system 110 includes a plurality of transaction destination locations (TDLs) and is partitioned into a plurality of shards 109, each of which will be referred herein below as the shard 109. In one non-limiting example, the database sub-system 110 may host a database having a given database table (or more than one). The given database table may be composed of at least two columns, such as a first column having keys and a second column having records that store data in association with the respective keys. In this non-limiting example, a given TDL may correspond to a given row of the given database table, that is, the given TDL may correspond to a given key and a respective record in the given database table.

As such, in this non-limiting example, each shard 109 of the database sub-system 110 hosts a portion of the given database table. Hence, the given plurality of TDLs, corresponding to the respective rows of the given database table, is split between the plurality of shards 109 such that each shard 109 comprises a respective subset (e.g. range) of the given plurality of TDLs.

In some embodiments of the present technology, it is contemplated that each one of the plurality of shards 109 may be implemented by a respective deterministic SM. This means that, upon receiving a given transaction destined to a TDL of a given shard 109 implemented by a given SM, the given SM may process the transaction and thereby transition to a new state thereof from a current state thereof based on the given transaction, as explained above.

The transaction routing sub-system 106 is configured to route transactions from the plurality of deterministic transaction 182 to respective TDLs and, therefore, to the respective shards 109 of the database sub-system 110. To that end, the transaction routing sub-system 106 may be formed by a plurality of ports that are generally configured to (i) receive the plurality of deterministic transactions 182 from the request pre-processing sub-system 104, (ii) order the plurality of deterministic transactions 182 into subsets of deterministic transactions destined to respective shards 109, and (iii) generate centralized per-shard orders for execution by the respective shards 109 of the deterministic transactions in each one of the centralized per-shard orders of execution.

It should be noted that each one of the plurality of ports forming the transaction routing sub-system 106 may be implemented as a respective SM. In some embodiments, it is contemplated that the plurality of ports may comprise two different types of ports for routing transactions from the plurality of deterministic transactions 182 to the respective shards 109. In other embodiments, at least some functionalities of the plurality of ports may be executed by the SMs corresponding to the plurality of shards 109.

Also, as depicted in FIG. 1, at least some of the SMs of the transaction processing sub-system 105 may be communicatively coupled to the distributed storage sub-system 108 by a respective communication link 160. Broadly speaking, the purpose of a given communication link 160 is to convey system data indicative of inter alia states, state transitions, external inputs and/or outputs of respective SMs to the distributed storage sub-system 108 for storage thereof. How the communication links 160 are established and how the distributed storage sub-system 108 is configured to store the system data will now be described in greater detail with reference to FIG. 2.

Figure 2:
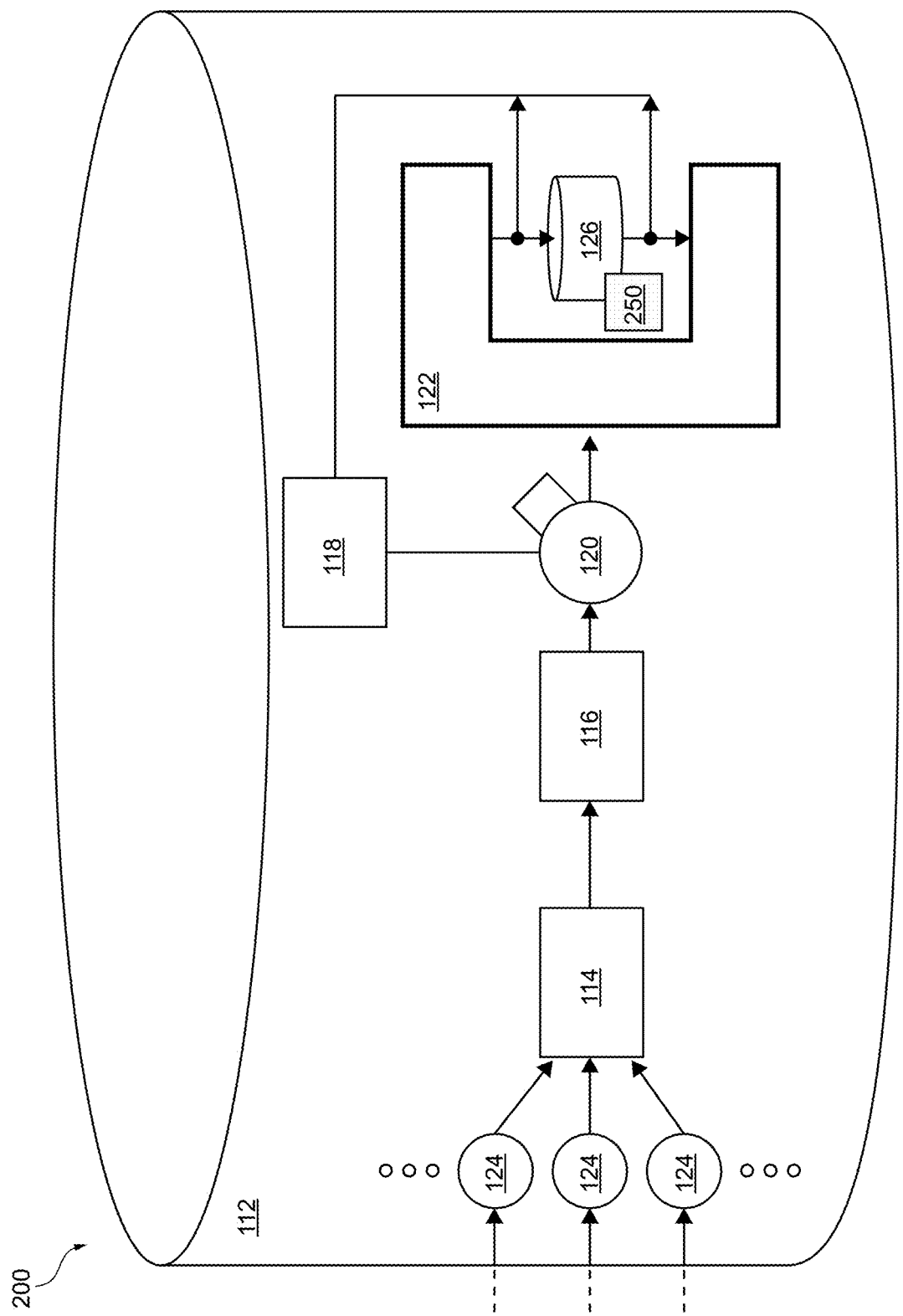
FIG. 2 depicts a storage device of a distributed storage sub-system of the system of FIG. 1 in accordance with some embodiments of the present technology.

In FIG. 2, there is depicted the storage device 112 which is part of the distributed storage sub-system 108. As previously mentioned, the storage device 112 comprises the at least one SM proxy 124. The purpose of a given SM proxy is to manage communication between a given SM and the distributed storage sub-system 108. In some embodiments of the present technology, it is contemplated that the at least one SM proxy 124 of the storage device 112 may be an Application Programing Interface (API) managing communication between a given SM and the storage device 112. In other embodiments of the present technology, the at least one SM proxy 124 itself can be implemented as a SM. In other embodiments of the present technology, the at least one SM proxy 124 can be implemented as a software module (not in itself a SM) for executing functions described immediately above.

In some embodiments of the present technology, a given SM proxy 124 may be configured to (i) receive system data indicative of a log update of a given SM via a respective communication link 160, (ii) process the system data, and (iii) transmit the processed system data to a respective Vdrive application 114 for further processing.

The at least one SM proxy 124 may be configured to process the system data, for example, for ensuring consistency and fault-tolerance of the system data. It is contemplated that the at least one SM proxy 124 may be configured to perform erasure-coding of system data, in some embodiments of the present technology. Broadly speaking, erasure-coding is an encoding method in which data is provided with redundancy and is then split into several fragments. Such redundancy provision and fragmentation may facilitate restoration of data if one ore more fragments are lost due to faults in a given system.

It is contemplated that the so-processed system data by the at least one SM proxy 124 is received by the at least one respective Vdrive application 114 of the storage device 112. The purpose of a given Vdrive application 114 is to process the system data received from the at least one SM proxy 124 and, in response, generate corresponding I/O operations that are to be executed by the memory drive 126 for storing the system data on the memory drive 126 of the storage device 112. Once the at least one Vdrive application 114 generates the I/O operations corresponding to the system data received thereby, the at least one Vdrive application 114 then transmits the I/O operations to the Pdrive application 116.

As such, it is contemplated that a given storage device 112 may have more than one SM proxies 124 for processing and transmitting system data to more than one respective Vdrive application 114, which in turn process the system data, generate respective I/O operations, and transmit the respective I/O operations to a single Pdrive application 116 of the storage device 112.

Broadly speaking, the purpose of the Pdrive application 116 is to control operation of the memory drive 126. For example, the Pdrive application 116 may be configured to perform encoding of I/O operations to be executed on the memory drive 126 and various other functionalities that facilitate reliable storage of data on the memory drive 126.

The Pdrive application 116 is commutatively coupled to the operation scheduling application 120 to transmit thereto the I/O operations. The operation scheduling application 120 is configured for scheduling the transmission of the I/O operations to the memory drive 126. It is contemplated that the operation scheduling application 120, or simply "scheduler" for short, may execute various scheduling schemes for determining an order in which the I/O operations are to be transmitted to the memory drive 126 for further execution.

It is contemplated that, in some embodiments of the present technology, the scheduler 120 may be implemented as part of the Pdrive application 116. In other words, execution of various scheduling schemes may be performed by the Pdrive application 116, without departing from the scope of the present technology.

In one case, the scheduler 120 may provide a scheduling scheme of a "fair" type. It should be understood that a given storage device 112 may require to store I/O operations corresponding to system data associated with more than one SMs. Also, each one of the more than one SMs is associated with a pre-determined proportion of drive bandwidth that the memory drive 126 may allocate for executing the I/O operations associated with that respective SM. Therefore, broadly speaking, fair-type scheduling schemes are configured to order the I/O operations to be transmitted to the memory drive 126 such that the drive bandwidth of the memory drive 126 for executing the ordered I/O operations is used in accordance with the pre-determined proportions associated with the more than one SMs.

In another case, the scheduler 120 may provide a scheduling scheme of a "real-time" type. It should be recalled that the distributed processing system 100 may be employed for providing cloud storage services. In many such implementations, it may be desirable to process system data and store it according to real-time requirements or, in other words, within a very short interval of time. As such, in order to support real-time requirements of the distributed processing system 100, the I/O operations may be associated with respective deadlines that are indicative of a moment in time after which the execution of the respective I/O operations is no longer performed within an acceptable amount of time for supporting real-time requirements of the distributed processing system 100. Therefore, broadly speaking, real-time scheduling schemes are configured to order the I/O operations to be transmitted to the memory drive 126 such that the I/O operations are to be executed by the memory drive 126 within respectively associated deadlines.

In a further case, the scheduler 120 may provide a hybrid scheduling scheme. In other words, the scheduler 120 may provide a scheduling scheme that is able to order the I/O operations for transmission of the memory drive 126 for execution such that the pre-determined proportions of drive bandwidth for each respective SM is respected and that respective deadlines of the I/O operations are also respected.

As previously mentioned, the memory drive 126 is a storage medium for executing I/O operations and thereby storing system data transmitted to the storage device 112. For example, the memory drive 126 may be implemented as an HDD or an SSD. The memory drive 126 includes a drive-internal logic 250 for selecting a given I/O operation for current execution amongst all I/O operations transmitted thereto.

It should be noted that I/O operations may potentially be sent one-by-one for execution to the memory drive 126, but this would result in an increased latency between the memory drive 126 and other components of the storage device 112. Therefore, the I/O operations may also be transmitted in batches or groups of I/O operations to the memory drive 126. Once a batch or group of I/O operations is received by the memory drive 126, the drive-internal logic 250 is configured to select amongst the I/O operations available thereto (from the batch) a most efficient I/O operation for execution.

For example, the most efficient I/O operation may be selected based on a variety of criteria such as, for example, a location where a previous I/O operation has been executed on the memory drive 126 and locations of the I/O operations available to the memory drive 126 where they are ought to be executed on the memory drive 126. In other words, the drive-internal logic 250 is configured to select, for current execution, a most efficient one (from the perspective of the memory drive 126) amongst all the I/O operations available to the memory drive 126 at a given moment in time.

For that reason, in some cases, although the scheduler 120 may have ordered I/O operations in a specific order of transmission for respecting the real-time requirements of the distributed processing system 100, the drive-internal logic 250 of the memory drive 126 may instruct the memory drive 126 to organize them in an execution order that is different from the transmission order selected by the scheduler 120. Therefore, it may happen that the execution order may no longer respect the real-time requirements of the distributed processing system 100 (especially as additional I/O operations are received from the scheduler 120, which additional I/O operations may be more "efficient" from the perspective of the memory drive 126 and that may be picked over non-yet-executed I/O operations).

In order to ensure real-time operation of the storage device 112 and to avoid the above-described problem (which is also known as "operation stagnation"), the storage device 112 may include the real-time operation enforcing application 122. Broadly speaking, the real-time operation enforcing application 122 allows controlling which I/O operations amongst those that have been already ordered by the scheduler 120 are transmitted at any given time to the memory drive 126 for execution.

It is contemplated that, in some embodiments of the present technology, the real-time operation enforcing application 122 may be implemented as part of the Pdrive application 116. In other words, the above-mentioned functionalities of the real-time operation enforcing application 122 may be performed by the Pdrive application 116, without departing from the scope of the present technology.

The storage device 112 is also configured to host at least one respective drive model application 118 for each memory drive 126 of the storage device 112. Broadly speaking, the drive model application 118 is configured to emulate ideal operation of the memory drive 126 for diagnostic analyses of the memory drive 126. In other embodiments, however, the scheduler 120 may also be configured to employ the drive model application 118 for ordering the I/O operations for transmission to the memory drive 126.

It is contemplated that, in some embodiments of the present technology, the at least one respective drive model application 118 may be implemented as part of the Pdrive application 116. In other words, the above-mentioned functionalities of the at least one respective drive model application 118 may be performed by the Pdrive application 116, without departing from the scope of the present technology.

Distributed Software System

Figure 3:
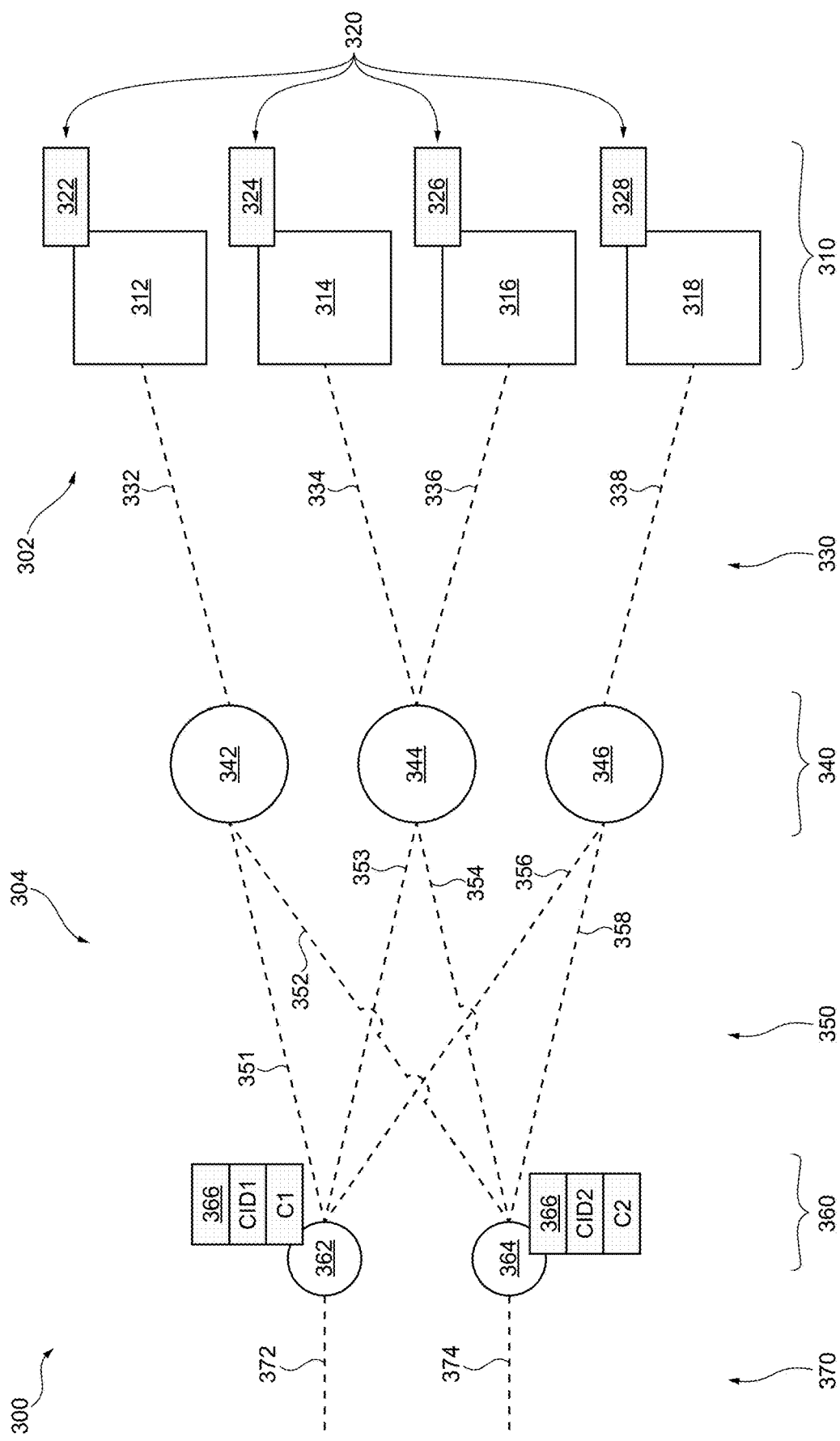
FIG. 3 depicts a schematic representation of a distributed software system for routing transactions in accordance with some embodiments of the present technology.

With reference to FIG. 3, there is depicted a schematic representation of a distributed software system 300 for routing and executing transactions (e.g., deterministic transactions). The distributed software system 300 comprises (i) a database sub-system 302 and (ii) a transaction routing sub-system 304. In one non-limiting example, the distributed software system 300 may be implemented as the transaction processing sub-system 105 of FIG. 1. More specifically, the transaction routing sub-system 304 may be implemented as the transaction routing sub-system 106 of FIG. 1 and the database sub-system 302 may be implemented as the database sub-system 110 of FIG. 1.

It should be noted that the transaction routing sub-system 304 and the database sub-system 302 may be implemented in a distributed manner over a plurality of storage devices (e.g., plurality of storage devices 112 of FIG. 1, and without departing from the scope of the present technology.

Plurality of Shards

On the right side of FIG. 3, there is depicted the database sub-system 302 (i) comprising a plurality of transaction destination locations (TDLs) 320 and (ii) is partitioned into a plurality of shards 310. For example, the plurality of shards 310 comprises a first shard 312, a second shard 314, a third shard 316, and a fourth shard 318. In one non-limiting example, the plurality of shards 310 may be the plurality of shards 109 of FIG. 1.

In one non-limiting example, the database sub-system 302 may host a database having a given database table (or more than one). The given database table may be composed of at least two columns, such as a first column having keys and a second column having records that store data in association with the respective keys. In this non-limiting example, a given TDL may correspond to a given row of the given database table, that is, the given TDL may correspond to a given key and a respective record in the given database table.

As such, in this non-limiting example, each shard of the database sub-system 302 hosts a portion of the given database table. Hence, the plurality of TDLs 320, corresponding to the respective rows of the given database table, is split between the plurality of shards 310 such that each shard of the plurality of shards 310 comprises a respective subset (e.g. range) of the plurality of TDLs 320.

It should be noted that, as explained above with reference to the plurality of shards 109, each one of the plurality of shards 310 may be implemented as a respective SM Although the plurality of shards 310 is depicted in FIG. 3 as including four shards, in other implementations of the present technology, a larger number of shards may be included in the plurality of shards 310, such as ten shards, a hundred shards, a thousand shards, and the like, without departing from the scope of the present technology.

It is also contemplated that the database sub-system 302 may be scalable. For example, it is contemplated that additional shards may be included to the plurality of shards 310 by an operator of the distributed software system 300 for scaling-up the size of the database sub-system 302. As it will become apparent from the description herein below, at least some implementations of the transaction routing sub-system 304 may facilitate this scalability of the database sub-system 302.

The plurality of TDLs 320 is split into respective ranges of the plurality of TDLs 320 and where each respective range is associated with a respective one of the plurality of shards 310. In other words, the plurality of TDLs 320 is split into a plurality of subsets of TDLs (e.g., ranges of TDLs) and where each subset of TDLs is associated with a respective shard from the plurality of shards 310. For example: (i) a first range 322 (e.g., a first subset) of the plurality of TDLs 320 is associated with the first shard 312, (ii) a second range 324 (e.g., a second subset) of the plurality of TDLs 320 is associated with the second shard 314, (iii) a third range 326 (e.g., a third subset) of the plurality of TDLs 320 is associated with the third shard 316, and (iv) a fourth range 328 (e.g., a fourth subset) of the plurality of TDLs 320 is associated with the fourth shard 318.

As mentioned above, a given one of the plurality of TDLs 320 may correspond to a given key in the database sub-system 302 and a respective cell (associated with the given key) for storing data in the database sub-system 302. Thus, it is contemplated that each one of the plurality of shards 310 is configured to store data in the database sub-system 302 that is associated with a given TDL that is included in a respectively associated range of the plurality of TDLs 320.

In one non-limiting example of the present technology, the plurality of TDLs 320 being split into respective ranges of the plurality of TDLs may correspond to a plurality of rows of a given database table (or more than one) being split into ranges of rows of the given database table. A given range of rows may comprise a subset of rows that have keys that are within a given key range.

Generally speaking, a given shard of the plurality of shards 310 is configured to (i) receive a respective centralized per-shard order of execution of transactions destined to TLDs in the respective range of the given shard, (ii) receive the transactions referenced in the respective centralized per-shard order of execution, and (iii) execute the received transactions in accordance with the respective centralized per-shard order of execution. Hence, the purpose of a given shard is to execute transactions destined to TDLs in the respective range of the plurality of TDLs 320 in a given centralized per-shard order of execution. In some alternative non-limiting embodiments of the present technology, (i) receiving the respective centralized per-shard order of execution of transactions destined to TLDs in the respective range of the given shard, (ii) receiving the transactions referenced in the respective centralized per-shard order of execution can be executed in a single step from a single source.

It should be understood that, in the context of the present technology, a given centralized per-shard order of execution for a given shard refers to a given order of execution of all transactions that are destined to the given shard amongst the transactions being received at a given moment in time by a respective mediator port of the distributed software system 300.

For example, a given centralized per-shard order of execution destined to the first shard 312 is an order of execution of all the transactions that are destined to the first range 322 amongst the transactions being received at a given moment in time by a first mediator port 342 of the distributed software system 300. In another example, a given centralized per-shard order of execution destined to the fourth shard 318 is an order of execution of all the transactions that are destined to the fourth range 328 amongst the transactions being received at a given moment in time by a third mediator port 346 of the distributed software system 300.

Since the database sub-system 302 may be executing more than one transaction at a time (e.g., each one of the plurality of shards 310 may be executing a respective transaction concurrently), the reason for executing transactions in respective centralized per-shard orders of execution by each one the plurality of shards 310 is to allow the database sub-system 302 to execute all the transactions destined to the database sub-system 302 such that the outcome would be the same if compared to a case where all the transactions destined to the database sub-system 302 are executed serially.

In other words, providing a centralized per-shard order of execution for a respective one of the plurality of shards 310 may allow the plurality of shards 310 to be executing more than one transactions concurrently such that the database sub-system 302 is affected by the more than one transactions in a same way that if the more than one transactions have been executed serially.

It should be noted that the plurality of shards 310 of the database sub-system 302 receives the respective centralized per-shard orders of execution from the transaction routing sub-system 304. More specifically, each one of the plurality of shards 310 receives its respective centralized per-shard order of execution from a respective one of a plurality of mediator ports 340 (depicted in the middle of FIG. 3) of the transaction routing sub-system 304.

Plurality of Mediator Ports

Each one of the plurality of mediator ports 340 of the transaction routing sub-system 304 may be implemented as a respective SM.

In accordance with the non-limiting embodiments of the present technology, a given shard is assigned to a given one of mediator ports 340. For example, the first shard 312 is pre-assigned to a first mediator port 342 and is, therefore, configured to receive its respective centralized per-shard order of execution from the first mediator port 342 via a first communication link 332. In another example, the second shard 314 is pre-assigned to a second mediator port 344 and is, therefore, configured to receive its respective centralized per-shard order of execution from the second mediator port 344 via a second communication link 334. In a further example, the third shard 316 is pre-assigned to the second mediator port 344 and is, therefore, configured to receive its respective centralized per-shard order of execution from the second mediator port 344 via a third communication link 336. In yet another example, the fourth shard 318 is pre-assigned to a third mediator port 346 and is, therefore, configured to receive its respective centralized per-shard order of execution from the third mediator port 346 via a fourth communication link 338.

In other words, respective ones of the plurality of shards 310 are pre-assigned to respective ones of the plurality of mediator ports 340 in accordance with a shard-to-mediator pre-assignment map 330. It can be said that the shard-to-mediator pre-assignment map 330 is indicative of which shard of the plurality of shards 310 is configured to receive its respective centralized per-shard order of execution from which mediator port of the plurality of mediator ports 340. It can also be said that the shard-to-mediator pre-assignment map 330 is indicative of which shard of the plurality of shards 310 is communicatively coupled to which mediator port of the plurality of mediator ports 340 via respective ones of the first communication link 332, the second communication link 334, the third communication link 336 and the fourth communication link 338.

It is contemplated that each shard of the plurality of shards 310 may have been assigned to a respective mediator port of the plurality of mediator ports 340 by an operator of the distributed software system 300. In other words, it is contemplated that the operator of the distributed software system 300 may have determined the shard-to-mediator pre-assignment map 330 and may have communicatively coupled the respective ones of the plurality of shards 310 and the respective ones of the plurality of mediator ports 340 via the first communication link 332, the second communication link 334, the third communication link 336 and the fourth communication link 338, accordingly.

Each one of the plurality of shards 310 is pre-assigned to a single one of the plurality of mediator ports 340. In other words, a given shard of the plurality of shards 310 is configured to receive a respective centralized per-shard order of execution from only a single mediator port of the plurality of mediator ports 340 to which it has been assigned. Therefore, it can be said that a "shard-to-mediator" relationship is a "one-to-one" relationship.

At least one of the plurality of shards 310 may be pre-assigned to a given one of the plurality of mediator ports 340. For example, only the first shard 312 of the plurality of shards 310 is pre-assigned to the first mediator port 342. Similarly, only the fourth shard 318 of the plurality of shards 310 is pre-assigned to the third mediator port 346. However, both the second shard 314 and the third shard 316 are pre-assigned to the second mediator port 344. Therefore, it can be said that a "mediator-to-shard" relationship is a "one-to-at least one" relationship—in other words, the "mediator-to-shard" relationship may be either a "one-to-one" relationship or a "one-to-many" relationship.

In accordance with the non-limiting example of FIG. 3, the first mediator port 342 is configured to generate and transmit a given centralized per-shard order of execution only for the first shard 312. Also, the third mediator port 346 is configured to generate and transmit a given centralized per-shard order of execution only for the fourth shard 318. However, the second mediator port 344, unlike the first mediator port 342 and the third mediator port 346, is configured to generate and transmit the respective given centralized per-shard orders of execution for both the second shard 314 and the third shard 316.

Each one of the plurality of mediator ports 340 is configured to generate the centralized per-shard order of execution for the respective shards that are pre-assigned thereto based on inter alia local per-shard orders received from a plurality of coordinator ports 360, depicted on the left side of FIG. 3, of the transaction routing sub-system 304.

Generally speaking, a given mediator port is configured to generate a given centralized per-shard order of execution for a given shard based on inter alia one or more local per-shard orders, and where a given local per-shard order is an order of transactions that (i) are destined to the given shard and (ii) have been received by the distributed software system 300 via a common point-of-entry of the distributed software system 300.

For example, if the distributed software system 300 has two point-of-entries, a given centralized per-shard order of execution for a given shard may be generated by a given mediator port based on two potential local per-shard orders. The first one of the two potential local per-shard orders is an order of transactions that have been received by a first one of the two point-of-entries of the distributed software system 300 and that are destined to the given shard. The second one of the two potential local per-shard orders is an order of transactions that have been received by a second one of the two point-of-entries of the distributed software system 300 and that are destined to the given shard.

How each one of the plurality of mediator ports 340 may be configured to generate the centralized per-shard order of execution for the respective shards that are pre-assigned thereto based on inter alia the local per-shard orders, will be described in greater detail herein further below.

Plurality of Coordinator Ports

The plurality of coordinator ports 360 of the transaction routing sub-system 304, which provide the local per-shard orders to the plurality of mediator ports 340, may be implemented as respective SMs.

Each one of the plurality of coordinator ports 360 is configured to receive a respective set of transactions that are to be routed to and executed by the database sub-system 302. Thus, it can be said that each one of the plurality of coordinator ports 360 is a respective point-of-entry for transactions into the distributed software system 300. For example, a first given set of transactions may be received by a first coordinator port 362 via a first point-of-entry communication link 372 and a second given set of transactions may be received by a second coordinator port 364 via a second point-of-entry communication link 374.

It is contemplated that in some embodiments of the present technology, a given transaction cannot be received by more than one of the plurality of coordinator ports 360. In other words, if the given transaction is received by the first coordinator port 362, the second coordinator port 364 cannot also receive the given transaction. By the same token, if the given transaction is received by the second coordinator port 364, the first coordinator port 362 cannot also receive the given transaction.

It should be noted that a given transaction not being receivable my more than one of the plurality of coordinator ports 360 is not meant to imply that a given transaction is to be received by a specific one of the plurality of coordinator ports 360, but rather that sets of transactions received by the plurality of coordinator ports 360 are mutually exclusive in some embodiments of the present technology.

Each one of the plurality of coordinator ports 360 locally stores or otherwise has access to coordination data 366 which is indicative of (i) the shard-to-mediator pre-assignment map 330 and (ii) a respective range of the plurality of TDLs 320 of each one of the plurality of shards 310. The purpose of the coordination data 366 is to allow each one of the plurality of coordinator ports 360 to know (i) which TDLs are associated with which one of the plurality of shards 310 and (ii) which shard is pre-assigned to which one of the plurality of mediator ports 340.

Generally speaking, a given coordinator port of the plurality of coordinator ports 360 is configured to (i) receive a respective set of transactions via a respective point-of-entry communication link, and (ii) based on the transactions in the set of transactions and the coordination data 366, generate respective local per-shard orders of transactions from the respective set of transactions.

Each transaction has a respective transaction-unique identifier (TUID) and an indication of at least one TDL to which it is destined in the database sub-system 302. It is contemplated that a given one of the plurality of coordinator ports 360 may order the transactions in the respective set of transactions based on the respective TUIDs. The given coordinator port may also determine which transactions are destined to which shards in the plurality of shards based on the coordination data 366. Hence, a given one of the plurality of coordinator ports 360 may, for each shard including at least one TDL associated with the respective set of transactions, generate a respective local per-shard order of transactions.

In summary, once a given coordinator port orders the set of transactions based on their respective TUIDs, the given coordinator port determines, from the ordered set of transactions, ordered subsets of transactions (e.g., local per-shard orders) that are destined to respective shards of the plurality of shards 310.

It is contemplated that, in the context of the present technology, a given local per-shard order for a given shard refers to a given order of transactions that are (i) received via a common point-of-entry (e.g., a given coordinator port) of the distributed software system 300 and (ii) destined to a given shard. Put another way, a given local per-shard order for a given shard refers to a given order of transactions that are received by a common coordinator port and that are destined to the given shard.

As opposed to a given centralized per-shard order of execution, which is a given order of execution of all transactions that are destined to the given shard amongst the transactions being routed by the distributed software system 300, a given local per-shard order is an order of transactions destined to the given shard that have been received by one of many coordinator ports of the plurality of coordinator ports 360.

Returning to the description of the plurality of coordinator ports 360, each one of the plurality of coordinator ports 360 has a respective coordinator identifier (CID) and a respective counter (C). For example, the first coordinator port 362 has a first CID being "CID1" and a first C being "C1", while the second coordinator port 364 has a second CID being "CID2" and a second C being "C2".

It is contemplated that CIDs are unique identifiers, which means that two given coordinator ports of the plurality of coordinator ports 360 cannot have a same CID and, therefore, each coordinator port of the plurality of coordinator ports 360 is uniquely identifiable by its respective CID.

It is contemplated that Cs of the respective ones of the plurality of coordinator ports 360 may have different values at a given moment in time amongst the plurality of coordinator ports 360. In other words, it is contemplated that in some embodiments of the present technology, the plurality of coordinator ports 360 may not be required to be synchronized amongst each other for having equal values of their respective Cs at any given moment in time.

The plurality of coordinator ports 360 is communicatively coupled with the plurality of mediator ports 340 via a plurality of coordinator-mediator communication links 350. For example, coordinator-mediator communication links 351, 353 and 356 communicatively couple the first coordinator port 362 with a respective one of the plurality of mediator ports 340. In another example, coordinator-mediator communication links 352, 354 and 358 communicatively couple the second coordinator port 364 with a respective one of the plurality of mediator ports 340.

In some embodiments of the present technology, it is contemplated that each one of the plurality of coordinator ports 360 may be configured to transmit respective local per-shard orders to respective ones of the plurality of mediator ports 340 with the respective CIDs and the then values of the respective Cs. It is contemplated that a given mediator port of the plurality of mediator ports 340 is configured to generate a given centralized per-shard order for a given shard based on (i) the respective local per-shard orders received from the plurality of coordinator ports 360 that are destined to the given shard and (ii) the respective CIDs and the values of the respective Cs of the plurality of coordinator ports 360 from which the given mediator port has received the respective local per-shard orders.

How the transaction routing sub-system 304 is configured to receive transactions, route transactions to the database sub-system 302, how the local per-shard orders are generated by the plurality of coordinator ports 360, how the centralized per-shard orders are generated by the plurality of mediator ports 340, and how the transactions are executed by the plurality of shards 310 will now be discussed in greater detail with reference to FIGS. 4 and 5.

Figure 4:
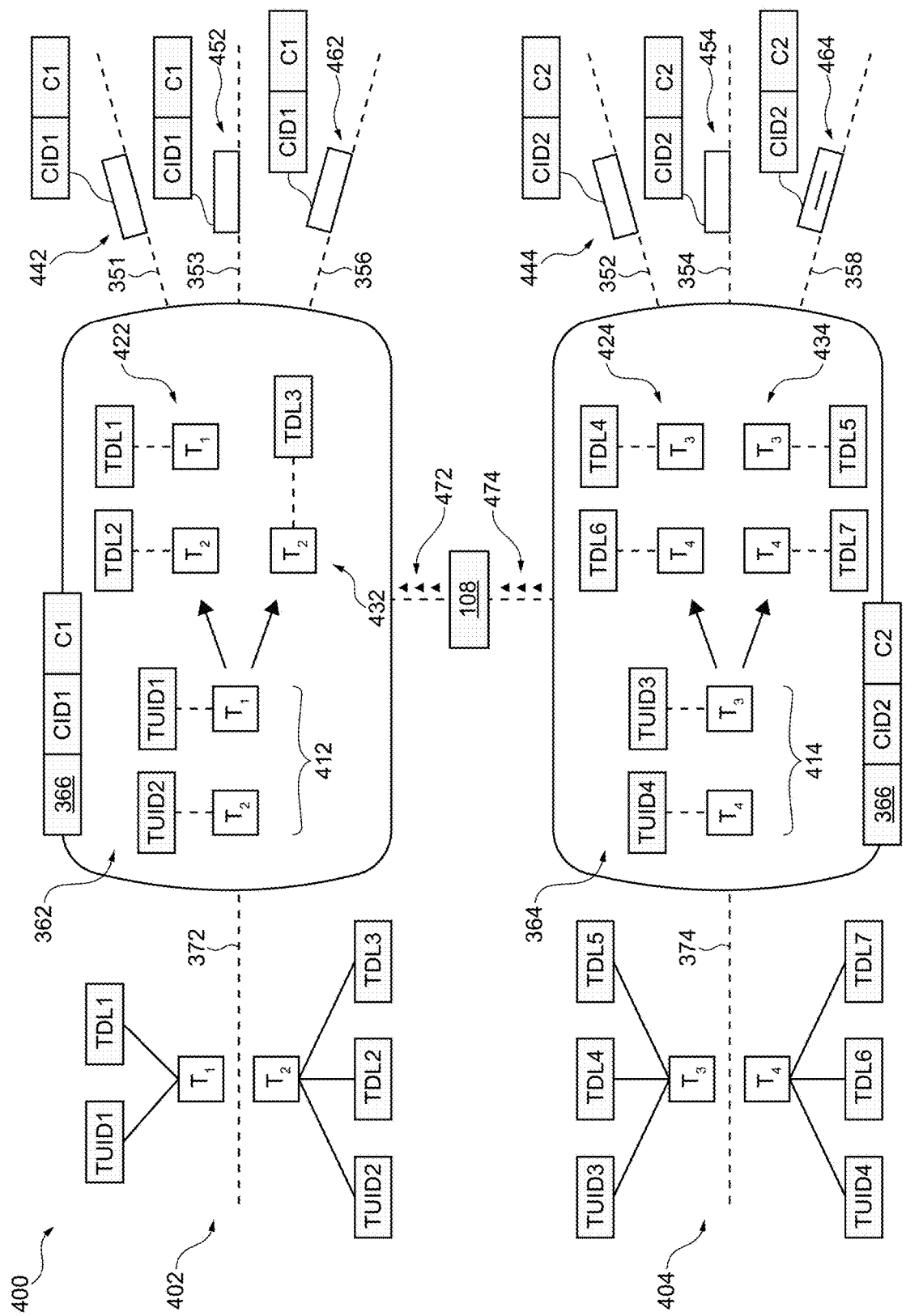
FIG. 4 depicts a schematic representation of processing executed by coordinator ports of the distributed software system of FIG. 3 in accordance with some embodiments of the present technology.

With reference to FIG. 4, there is depicted a schematic representation 400 of processing of transactions by the first coordinator port 362 and the second coordinator port 364. As illustrated, let it be assumed that the first coordinator port 362 receives via the first point-of-entry communication link 372 a first set of transactions 402 comprising a first transaction T1 and a second transaction T2, while the second coordinator port 364 receives via the second point-of-entry communication link 374 a second set of transactions 404 comprising a third transaction T3 and a fourth transaction T4.

In one non-limiting example, both the first set of transactions 402 and the second set of transactions 404 may be part of the plurality of deterministic transactions 182 (see FIG. 1). As such, it is contemplated that in some embodiments of the present technology, T1 to T4 may be deterministic transactions destined to the database sub-system 302 (see FIG. 3).

As previously mentioned, each transaction has a respective TUID and is indicative of at least one TDL to which it is destined. For example:

T1 has a TUID1 and is destined to (has an indication of) TDL1;

T2 has a TUID2 and is destined to (has an indication of) both TDL2 and TDL3;

T3 has a TUID3 and is destined to (has an indication of) both TDL4 and TDL5; and T4 has a TUID4 and is destined to (has an indication of) both TDL6 and TDL7.

Once the first set of transactions 402 is received by the first coordinator port 362, the first coordinator port 362 is configured to order the transactions in the first set of transactions 402 based on the respective TUIDs. In other words, the first coordinator port 362 may apply an ordering algorithm on the respective TUIDs of the first set of transaction 402. Let it be assumed that TUID1 and TUID2 are alphanumerical identifiers and that TUID2 would be before TUID1 if placed in an alphanumerical order. In this example, the first coordinator port 362 is configured to generate an ordered set of transactions 412 based on the TUID1 and the TUID2, such that T2 having TUID2 is a first one in the ordered set of transactions 412 followed by T1 having TUID1 in the ordered set of transactions 412.

Once the ordered set of transactions 412 is generated by the first coordinator port 362, the first coordinator port 362 may be configured to generate a first local per-shard order 422 and a second local per-shard order 432. The first coordinator port 362 is configured to generate the first local per-shard order 422 and the second local per-shard order 432 based on (i) the respective TDLs of each one of T1 and T2 and (ii) the coordination data 366.

The first coordinator port 362 may determine that (i) TDL1 and TDL2 are within the first range 322 of the plurality of TDLs 320 associated with the first shard 312 (see FIG. 3), and (ii) TDL3 is within the third range 326 of the plurality of TDLs 320 associated with the third shard 316 (see FIG. 3). For example, TDL1 and TDL2 may correspond to rows in a given database table that are within the range of rows of the first shard 312. The first coordinator port 362 may determine that TDL1 and TDL2 correspond to rows within the range of rows of the first shard 312 based on keys of the rows in the range of rows of the first shard 312. As a result, the first coordinator port 362 is configured to generate (i) the first local per-shard order 422 indicative of T2 followed by T1 and destined to the first shard 312, and (ii) the second local per-shard order 432 indicative of T2 and destined to the third shard 316.

In addition, the first coordinator port 362 is configured to, based on the coordination data 366, transmit a first coordinator packet 442 comprising data indicative of the first local per-shard order 422, via the coordinator-mediator communication link 351, to the first mediator port 342 since the first shard 312 (to which the first local per-shard order 422 is destined) is pre-assigned to the first mediator port 342.

Similarly, the first coordinator port 362 is configured to, based on the coordination data 366, transmit a second coordinator packet 452 comprising data indicative of the second local per-shard order 432, via the coordinator-mediator communication link 353, to the second mediator port 344 since the third shard 316 (to which the second local per-shard order 422 is destined) is pre-assigned to the second mediator port 344.

It is contemplated that the first coordinator port 362 is also configured to transmit an empty coordinator packet 462 via the coordinator-mediator communication link 356 to the third mediator port 346. How each one of the first coordinator packet 442, the second coordinator packet 452 and the empty coordinator packet 462 are processed by the respective ones of the plurality of mediator ports 340 will be described in greater detail herein further below with reference to FIG. 5.

However, it should be noted that each one of the first coordinator packet 442, the second coordinator packet 452 and the empty coordinator packet 462 is indicative of the CID1 of the first coordinator port 362 and of a value of C1 of the first coordinator port 362 at the moment in time when the first coordinator port 362 sends the first coordinator packet 442, the second coordinator packet 452 and the empty coordinator packet 462.

In other embodiments of the present technology, each one of the first coordinator packet 442, the second coordinator packet 452 and the empty coordinator packet 462 is indicative of the CID1 of the first coordinator port 362 and of a value of C1 of the first coordinator port 362 at the moment in time when the first coordinator port 362 receives the first set of transactions 402.

In additional embodiments, each one of the first coordinator packet 442, the second coordinator packet 452 and the empty coordinator packet 462 is indicative of the CID1 of the first coordinator port 362 and of a value of C1 of the first coordinator port 362 at any moment in time between (i) the moment in time when the first coordinator port 362 receives the first set of transactions 402, and (ii) the moment in time when the first coordinator port 362 sends the first coordinator packet 442, the second coordinator packet 452 and the empty coordinator packet 462.

In some embodiments of the present technology, where the first coordinator port 362 is implemented as a given SM, it is contemplated that the first coordinator port 362 may be configured to transmit system data 472 to the distributed storage sub-system 108 which represents a log update to the log associated with the given SM and which is at least partially indicative of the first local per-shard order 422 and of the second local per-shard order 432.

In some embodiments of the present technology, in a case where the first coordinator port 362 is malfunctioning, becomes inoperable or otherwise is communicatively decoupled from the distributed software system 300, a new coordinator port may be employed to replace the first coordinator port 362 and the data indicative of the first local per-shard order 422 and of the second local per-shard order 432 may be retrieved from the log update represented by the system data 472 that is stored in the distributed storage sub-system 108, without departing from the scope of the present technology.

Similarly to what has been described above with respect to the first coordinator port 362, the second coordinator port 364 is configured to generate an ordered set of transactions 414 based on the TUID3 and the TUID4, such that T4 having TUID4 is a first one in the ordered set of transactions 414 followed by T3 having TUID3 in the ordered set of transactions 414. In this example, let it be assumed that TUID3 and TUID4 are alphanumerical identifiers and that TUID4 would be before TUID3 if placed in an alphanumerical order.

Once the ordered set of transactions 414 is generated by the second coordinator port 364, the second coordinator port 364 may be configured to generate a third local per-shard order 424 and a fourth local per-shard order 434. As explained above, the second coordinator port 364 is configured to generate the third local per-shard order 424 and the fourth local per-shard order 434 based on (i) the respective TDLs of each one of T3 and T4 and (ii) the coordination data 366.

The second coordinator port 364 may determine that (i) TDL6 and TDL4 are within the first range 322 of the plurality of TDLs 320 associated with the first shard 312 (see FIG. 3), and (ii) TDL7 and TDL5 are within the second range 324 of the plurality of TDLs 320 associated with the second shard 314 (see FIG. 3). For example, TDL6 and TDL4 may correspond to rows in a given database table that are within the range of rows of the first shard 312. The second coordinator port 364 may determine that TDL6 and TDL4 correspond to rows within the range of rows of the first shard 312 based on keys of the rows in the range of rows of the first shard 312. Also, TDL7 and TDL5 may correspond to rows in a given database table that are within the range of rows of the second shard 314. The second coordinator port 364 may determine that TDL7 and TDL5 correspond to rows within the range of rows of the second shard 314 based on keys of the rows in the range of rows of the second shard 314. As a result, the second coordinator port 364 is configured to generate (i) the third local per-shard order 424 indicative of T4 followed by T3 and destined to the first shard 312, and (ii) the fourth local per-shard order 434 indicative of T4 followed by T3 and destined to the second shard 314.

In addition, the second coordinator port 364 is configured to, based on the coordination data 366, transmit a third coordinator packet 444 comprising data indicative of the third local per-shard order 424, via the coordinator-mediator communication link 352, to the first mediator port 342 since the first shard 312 (to which the third local per-shard order 424 is destined) is pre-assigned to the first mediator port 342.

Similarly, the second coordinator port 364 is configured to, based on the coordination data 366, transmit a fourth coordinator packet 454 comprising data indicative of the fourth local per-shard order 434, via the coordinator-mediator communication link 354, to the second mediator port 344 since the second shard 314 (to which the fourth local per-shard order 434 is destined) is pre-assigned to the second mediator port 344.

It is contemplated that the second coordinator port 364 is also configured to transmit an empty coordinator packet 464 via the coordinator-mediator communication link 358 to the third mediator port 346. How each one of the third coordinator packet 444, the fourth coordinator packet 454 and the empty coordinator packet 464 are processed by the respective ones of the plurality of mediator ports 340 will be described in greater detail herein further below with reference to FIG. 5.

However, it should be noted that each one of the third coordinator packet 444, the third coordinator packet 454 and the empty coordinator packet 464 is indicative of the CID2 of the second coordinator port 364 and of the value of C2 of the second coordinator port 364 at the moment in time when the second coordinator port 364 sends the third coordinator packet 444, the fourth coordinator packet 454 and the empty coordinator packet 464.

In other embodiments of the present technology, each one of the third coordinator packet 444, the fourth coordinator packet 454 and the empty coordinator packet 464 is indicative of the CID2 of the second coordinator port 364 and of a value of C2 of the second coordinator port 364 at the moment in time when the second coordinator port 364 receives the second set of transactions 404.

In additional embodiments, each one of the third coordinator packet 444, the fourth coordinator packet 454 and the empty coordinator packet 464 is indicative of the CID2 of the second coordinator port 364 and of a value of C2 of the second coordinator port 364 at any moment in time between (i) the moment in time when the second coordinator port 364 receives the second set of transactions 404, and (ii) the moment in time when the second coordinator port 364 sends the third coordinator packet 444, the fourth coordinator packet 454 and the empty coordinator packet 464.

In some embodiments of the present technology, where the second coordinator port 364 is implemented as a given SM, it is contemplated that the second coordinator port 364 may be configured to transmit system data 474 to the distributed storage sub-system 108 which represents a log update to the log associated with the given SM and which is at least partially indicative of the third local per-shard order 424 and of the fourth local per-shard order 434. The second coordinator port 364 may transmit the system data 474 to the distributed storage sub-system 108 for at least the same reasons as the first coordinator port 362 may be configured to send the system data 472 to the distributed storage sub-system 108.

In summary, the first coordinator port 362 generates the first local per-shard order 422 from the first set of transactions 402 and destined to the first shard 312 pre-assigned to the first mediator port 342. the first coordinator port 362 also generates the second local per-shard order 432 from the first set of transactions 402 and destined to the third shard 316 pre-assigned to the second mediator port 344.

Also in summary, the second coordinator port 364 generates the third local per-shard order 424 from the second set of transactions 404 and destined to the first shard 312 pre-assigned to the first mediator port 342. the second coordinator port 364 also generates the fourth local per-shard order 434 from the second set of transactions 404 and destined to the second shard 314 pre-assigned to the second mediator port 344.

Also in summary, the first coordinator port 362 and the second coordinator port 364 also transmit respectively, the empty coordinator packet 462 and the empty coordinator packet 464 to the third mediator port 346.

It should be noted that in some embodiments of the present technology, it is contemplated that a number of the plurality of coordinator ports 360 may be smaller than the number of the plurality of mediator ports 340 as depicted in FIG. 3, for example. Also, it is contemplated that the number of the plurality of mediator ports 340 may be smaller that the number of the plurality of shards 310 as depicted in FIG. 3, for example.

Figure 5:
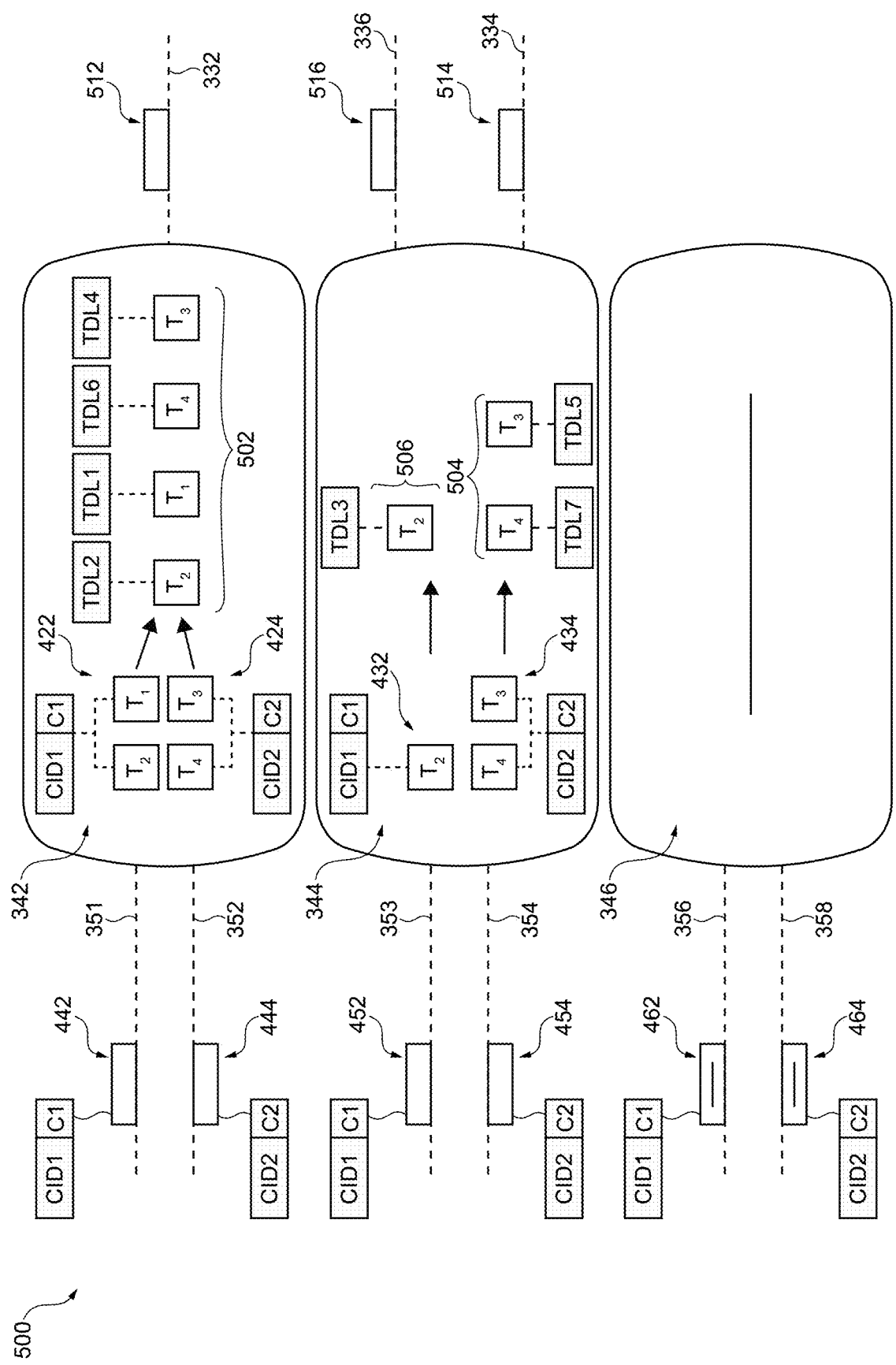
FIG. 5 depicts a schematic representation of processing executed by mediator ports of the distributed software system of FIG. 3 in accordance with some embodiments of the present technology.

With reference to FIG. 5, there is depicted a schematic representation 500 of processing of local per-shard orders received from the first coordinator port 362 and the second coordinator port 364 by the plurality of mediator ports 340.

As illustrated at the top portion of FIG. 5, the first mediator port 342 receives the first coordinator packet 442 from the first coordinator port 362 and the third coordinator packet 444 from the second coordinator port 364.

Therefore, the first mediator port 342 receives (i) data indicative of the first local per-shard order 422 destined to the first shard 312 and which is associated with the CID1 and a given value of C1 of the first coordinator port 362 and (ii) data indicative of the third local per-shard order 424 destined to the first shard 312 and which is associated with the CID2 and a given value of C2 of the second coordinator port 364. In some embodiments of the present technology, the first mediator port 342 may be configured to generate a first centralized per-shard order of execution 502 for the first shard 312 based on inter alia the first local per-shard order 422 and the third local per-shard order 424.

It is contemplated that in some embodiments of the present technology, a given mediator port, prior to generating a given centralized per-shard order of execution for a given shard that is pre-assigned thereto, may be configured to verify whether a respective coordinator packet has been received from each one of the plurality of coordinator ports 360.

For example, if the first mediator port 342 has received the first coordinator packet 442 from the first coordinator port 362 but did not receive any coordinator packet from the second coordinator port 364, the first mediator port 342 may be configured not to begin generation of the first centralized per-shard order of execution 502 since it is still unclear, from the "perspective" of the first mediator port 342, whether (i) the second coordinator port 364 simply did not generate any local per-shard order for the first shard 312 or (ii) the second coordinator port 364 is malfunctioning, became inoperable or otherwise communicatively decoupled from the first mediator port 342.

For that reason, in some embodiments of the present technology, a given coordinator port of the plurality of coordinator ports 360 may be configured to generate a given empty coordinator packet destined to a given mediator port, such as the empty coordinator packet 462 and the empty coordinator packet 464, for example, which is associated with the respective CID and a given value of C of the given coordinator port for notifying the given mediator port that the given coordinator port is still communicatively coupled thereto and simply did not generate any local per-shard order destined to a given shard associated with the given mediator port.

As a result, in some embodiments of the present technology, generation of empty coordinator packets by coordinator ports may ensure that a given mediator port does not begin the generation of a given centralized per-shard order for a given shard that is pre-assigned thereto before having received all the local per-shard orders destined to the given shard from the plurality of coordinator ports 360.

As mentioned above, the first mediator port 342 is configured to generate the first centralized per-shard order of execution 502 based on the first local per-shard order 422 and the third local per-shard order 424. For example, the first mediator port 342 may be configured to compare the given value of C1 associated with the first local per-shard order 422 and the given value of C2 associated with the third local per-shard order 424.

In one case, let it be assumed that the given value of C1 is inferior to the given value of C2. As a result and as illustrated in FIG. 5, the first mediator port 342 may determine that T4 and T3 from the third local per-shard order 424 are to be executed later in time than T2 and T1 from the first local per-shard order 422. Therefore, the first mediator port 342 may generate the first centralized per-shard order 502 indicative of T2 followed by T1 followed by T4 followed by T3.

In another case, let it be assumed that the given value of C1 is superior to the given value of C2. As a result, in this case, the first mediator port 342 may determine that T2 and T1 from the first local per-shard order 422 are to be executed later in time than T4 and T3 from the third local per-shard order 424. Therefore, in this case, the first mediator port 342 may generate a given first centralized per-shard order being indicative of T4 followed by T3 followed by T2 followed by T1.

In a further case, let it be assumed that the given value of C1 is equal to the given value of C2. As a result, in this case, the first mediator port 342 may be configured to re-order T1, T2, T3 and T4 amongst each other based on their respective TUIDs. It is contemplated that in this case, the first mediator port 342 may be configured to re-order T1, T2, T3 and T4 amongst each other based on the same ordering rules (e.g., ordering algorithm) that the plurality of coordinator ports 360 employ for ordering transactions.

It is also contemplated that in a case where the given value of C1 is equal to the given value of C2, the first mediator port 342 may be pre-configured to prioritize transactions in a given centralized per-shard order of execution based on a pre-ranked order of prioritization of coordinator ports. For example, if the first coordinator port 362 is pre-ranked as being above the second coordinator port 364 (in the order of prioritization of coordinator ports), in response to determining that the given value of C1 is equal to the given value of C2, the first mediator port 342 may be configured to prioritize T2 and T1 to T4 and T3 in a given first centralized per-shard order destined to the first shard 312.

Once the first centralized per-shard order of execution 502 is generated by the first mediator port 342, the first mediator port 342 may be configured to generate a first mediator packet 512 comprising data indicative of the first centralized per-shard order 502. The first mediator port 342 may be configured to transmit the first mediator packet 512 via the first communication link 332 to the first shard 312 so that the first shard 312 executes T1, T2, T3 and T4 in accordance with the first centralized per-shard order of execution 502.

As illustrated in the middle portion of FIG. 5, the second mediator port 344 receives the second coordinator packet 452 from the first coordinator port 362 and the fourth coordinator packet 454 from the second coordinator port 364.

Therefore, the second mediator port 344 receives (i) data indicative of the second local per-shard order 432 destined to the third shard 316 and which is associated with the CID1 and a given value of C1 of the first coordinator port 362 and (ii) data indicative of the fourth local per-shard order 434 destined to the second shard 314 and which is associated with the CID2 and a given value of C2 of the second coordinator port 364. In some embodiments of the present technology, the second mediator port 344 may be configured to generate (i) a second centralized per-shard order of execution 504 for the second shard 314 based on the fourth local per-shard order 434 and (ii) a third centralized per-shard order of execution 506 for the third shard 316 based on the second local per-shard order 432.

It is contemplated that in some embodiments of the present technology, a given mediator port, prior to be configured to generate a given centralized per-shard order of execution for a given shard that is pre-assigned thereto, may be configured to verify which coordinator packets received thereby comprise data indicative of local per-shard orders destined to the given shard. For example, the given mediator port may be configured to analyze the local per-shard orders received thereby in order to determine which of the local per-shard orders received thereby are destined to which of the respective pre-assigned shards.

In the non-limiting example of FIG. 5, the second mediator port 344 may be configured to analyze the second local per-shard order 432 and the fourth local per-shard order 434 received by the second mediator port 344. In this case, the second mediator port 344 may be configured to determine that the second local per-shard order 432 and the fourth local per-shard order 434 are destined to different shards pre-assigned to the second mediator port 344, namely, the third shard 316 and the second shard 314, respectively.

In some embodiments of the present technology, the second mediator port 344 may be configured to determine that the second centralized per-shard order of execution 504 is to be generated based on all the local per-shard orders received thereby that are destined to the second shard 314—in this case, all the local per-shard orders received by the second mediator port 344 that are destined to the second shard 314 include only the fourth local per-shard order 434. Also, in some embodiments of the present technology, the second mediator port 344 may be configured to determine that the third centralized per-shard order of execution 506 is to be generated based on all the local per-shard orders received thereby that are destined to the third shard 316—in this case, all the local per-shard orders received by the second mediator port 344 that are destined to the third shard 316 include only the second local per-shard order 432.

It is contemplated that, in some embodiments of the present technology, in response to determining that only one local per-shard order received by a given mediator port is destined to a given shard pre-assigned thereto, the given mediator port may be configured to generate the respective centralized per-shard order of execution by identifying the only one local per-shard order as the respective centralized per-shard order of execution.

For example, in response to determining that only the fourth local per-shard order 434 received by the second mediator port 344 is destined to second shard 314, the second mediator port 344 may be configured to generate the second centralized per-shard order of execution 504 by identifying the fourth local per-shard order 434 as the second centralized per-shard order of execution 504. Also, in response to determining that only the second local per-shard order 432 received by the second mediator port 344 is destined to third shard 316, the second mediator port 344 may be configured to generate the third centralized per-shard order of execution 506 by identifying the second local per-shard order 432 as the third centralized per-shard order of execution 506.

Once the second centralized per-shard order of execution 504 is generated by the second mediator port 344, the second mediator port 344 may be configured to generate a second mediator packet 514 comprising data indicative of the second centralized per-shard order of execution 504. The second mediator port 344 may be configured to transmit the second mediator packet 514 via the second communication link 334 to the second shard 314 so that the second shard 314 executes T4 and T3 in accordance with the second centralized per-shard order of execution 504.

Once the third centralized per-shard order of execution 506 is generated by the second mediator port 344, the second mediator port 344 may be configured to generate a third mediator packet 516 comprising data indicative of the third centralized per-shard order of execution 506. The second mediator port 344 may be configured to transmit the third mediator packet 516 via the third communication link 336 to the third shard 316 so that the third shard 316 executes T2 in accordance with the third centralized per-shard order of execution 506.

As illustrated in the bottom portion of FIG. 5, the third mediator port 346 receives the empty coordinator packet 462 from the first coordinator port 362 and the empty coordinator packet 464 from the second coordinator port 364.

It is contemplated that the third mediator port 346, prior to generating a given centralized per-shard order of execution for the fourth shard that is pre-assigned thereto, may be configured to verify whether a respective coordinator packet has been received from each one of the plurality of coordinator ports 360.

In this case, the third mediator port 346 may determine that a respective coordinator packet has been received from each one of the plurality of coordinator ports 360, namely the empty coordinator packet 462 from the first coordinator port 362 and the empty coordinator packet 464 from the second coordinator port 364.

In this case, it is contemplated that the third mediator port 346 may be configured not to generate any centralized per-shard order of execution for the fourth shard 318 pre-assigned thereto. The third mediator port 346 configured not to generate any centralized per-shard order of execution for the fourth shard 318 may be equivalent to an inaction by the third mediator port 346.

It can be said that, if the third mediator port 346 determines that (i) it received a respective coordinator packet from each of the plurality of coordinator ports 360, but (ii) it did not receive any local per-shard order destined to the fourth shard 318, the third mediator port 346 may be configured to halt communication with the fourth shard 318 over the fourth communication link 338 (see FIG. 3).

In some embodiments of the present technology, where the plurality of mediator ports 340 are implemented as respective SMs, it is contemplated that the plurality of mediator ports 340 may be configured to transmit system data representative of log updates to the distributed storage sub-system 108 for storage thereof in respectively associated logs. However, it is also contemplated that in some embodiments of the present technology, the plurality of mediator ports 340 may not require or may be configured not to transmit system data to the distributed storage sub-system 108 for storage thereof.

Figure 6:
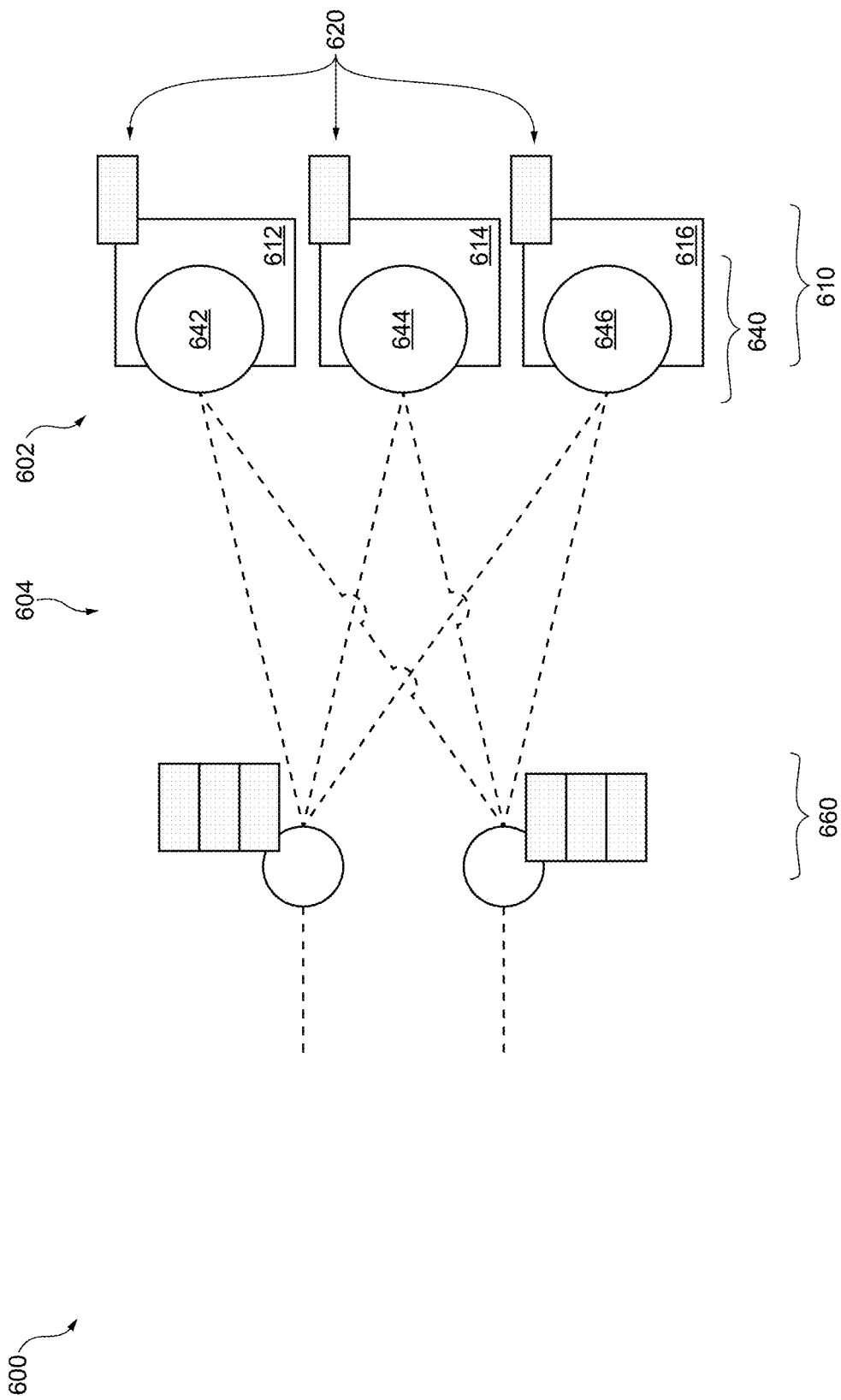
FIG. 6 depicts a schematic representation of a distributed software system for routing transactions in accordance with other embodiments of the present technology.

With reference to FIG. 6, there is depicted a schematic representation of a distributed software system 600 for routing and executing transactions, in accordance with an alternative embodiment of the present technology. The distributed software system 600 comprises (i) a database sub-system 602 and (ii) a transaction routing sub-system 604.

The database sub-system 602 comprises a plurality of shards 610 and where each one of the plurality of shards 610 is associated with a respective range of a plurality of TDLs 620. The transaction routing sub-system 604 comprises a plurality of coordinator ports 660 and a plurality of mediator ports 640.

It is contemplated that the distributed software system 600 routes and executes transactions in a similar manner to what has been described above with respect to the distributed software system 300. However, as opposed to the distributed software system 300, the plurality of mediator ports 640 are implemented as part of the plurality of shards 610. In other words, in some embodiments of the present technology, it is contemplated that the functionality of a given mediator port may be implemented by a given shard.

For example, a mediator port 642 may be implemented as part of a shard 612, a mediator port 644 may be implemented as part of a shard 614, and a mediator port 646 may be implemented as part of a shard 616.

It is contemplated that in other embodiments of the present technology, at least some of the plurality of mediator ports 640 may implemented as part of respective ones of the plurality of shards 610, while at least some other of the plurality of mediator ports 640 may be implemented as separate entities from the respective ones of the plurality of shards 610, without departing from the scope of the present technology.

Figure 7:
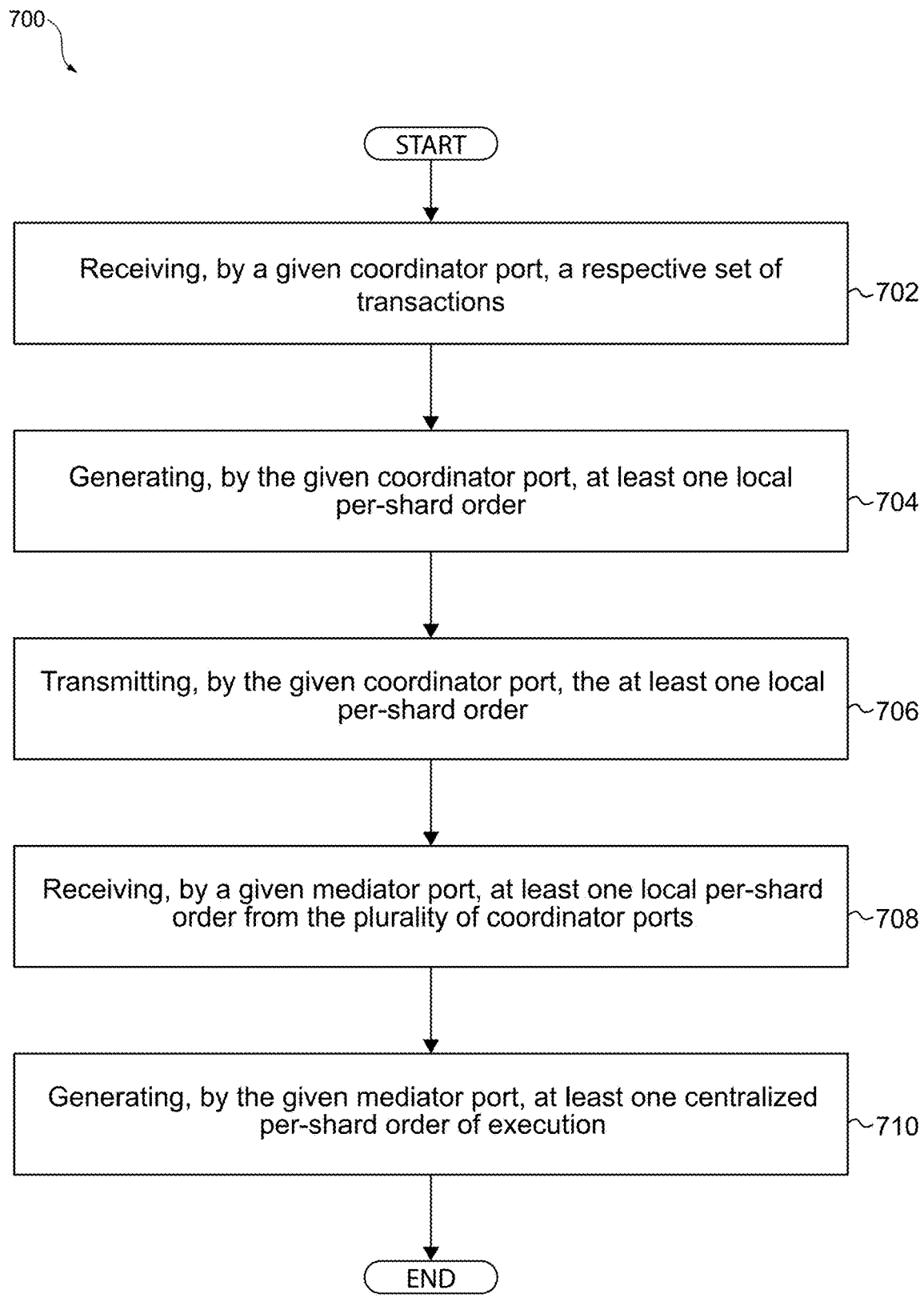
FIG. 7 depicts a block diagram of a method, the method being executable within the distributed software system of FIG. 3 and being implemented in accordance with non-limiting embodiments of the present technology.

In some embodiments of the present technology, the distributed software system 300 depicted in FIG. 3 may be configured to execute a method 700, depicted in FIG. 7, for routing transactions for execution. The method 700 will now be described.

STEP 702: Receiving, by a Given Coordinator Port, a Respective Set of Transactions The method 700 begins at step 702 with a given coordinator port receiving a respective set of transactions. In one example, with reference to FIG. 4, the first coordinator port 362 receives via the first point-of-entry communication link 372 the first set of transactions 402. In another example, the second coordinator port 364 receives via the second point-of-entry communication link 374 the second set of transactions 404.

In some embodiments of the present technology, it is contemplated that a given set of transaction received by the given coordinator port may comprise deterministic transactions.

It is contemplated that the set of transactions received by the given coordinator port may be mutually exclusive with other sets of transactions received by other given coordinator ports of the distributed software system 300 (or of the distributed software system 600).

It should be noted that each transaction received by the given coordinator port has a respective TUID and is associated with at least one respective TDL for execution. For example, as depicted in FIG. 4, T1 has a TUID1 and is destined to (has an indication of) TDL1;

T2 has a TUID2 and is destined to (has an indication of) both TDL2 and TDL3;

T3 has a TUID3 and is destined to (has an indication of) both TDL4 and TDL5; and T4 has a TUID4 and is destined to (has an indication of) both TDL6 and TDL7.

It is contemplated that a given transaction received by the coordinator port may have an alphanumerical TUID. It is also contemplated that a given transaction received by the coordinator port may have an indication of a respective TDL. For example, the given transaction may have an indication of a given row of a given database table to which this transaction is destined. For example, the indication of the given row may take form of at least a key of the given row of a given database table.

In some embodiments, the given transaction being destined to a respective TDL may imply that the given transaction is to be executed on the respective TDL. For example, the given transaction being destined to a given row of a given database table may imply that the given transaction is configured for reading/writing data in the given record associated with the given key of the given row of the given database table.

STEP 704: Generating, by the Given Coordinator Port, at Least One Local Per-Shard Order The method 700 continues to step 704 with the given coordinator port of the step 702 generating at least one local per-shard order based on the TUIDs of the transactions in the respective set of transactions.

In one example, with reference to FIG. 4, the first coordinator port 362 may be configured to generate the first local per-shard order 422 and the second local per-shard order 432 based on the TUIDs and the TDLs of each one of the first set of transactions 402. In another example, the second coordinator port 364 may be configured to generate the third local per-shard order 424 and the fourth local per-shard order 434 based on the TUIDs and the TDLs of each one of the second set of transactions 404.

It should be noted that a given one of the at least one local per-shard order comprises transactions from the respective set of transactions that are destined to TDLs of a given shard from the plurality of shards 310 (or 610).

For example, the first local per-shard order 422 comprises transactions from the first set of transactions 402 that are destined to TDLs of the first shard 312 from the plurality of shards 310. In another example, the third local per-shard order 424 comprises transactions from the second set of transactions 404 that are destined to TDLs of the first shard 312 from the plurality of shards 310.

In some embodiments of the present technology, generating at least one local per-shard order by the given coordinator port may comprise ordering transactions in the set of transactions and thereby generating a given ordered set of transactions.

For example, the first coordinator port 362, in order to generate the first local per-shard order 422 and the second local per-shard order 432, may be configured to order the first set of transactions 402, thereby generating the first ordered set of transactions 412. In another example, the second coordinator port 364, in order to generate the third local per-shard order 424 and the fourth local per-shard order 434, may be configured to order the second set of transactions 404, thereby generating the second ordered set of transactions 414.

STEP 706: Transmitting, by the Given Coordinator Port, the at Least One Local Per-Shard Order The method 700 continues to step 706 with the given coordinator port of the steps 702 and 704 transmitting the at least one local per-shard order to a respective mediator port that is pre-assigned to the given shard from a plurality of shards.

For example, the second coordinator port 364 is configured to, based on the coordination data 366, transmit a third coordinator packet 444 comprising data indicative of the third local per-shard order 424, via the coordinator-mediator communication link 352, to the first mediator port 342 since the first shard 312 (to which the third local per-shard order 424 is destined) is pre-assigned to the first mediator port 342. In another example, the second coordinator port 364 is configured to, based on the coordination data 366, transmit a fourth coordinator packet 454 comprising data indicative of the fourth local per-shard order 434, via the coordinator-mediator communication link 354, to the second mediator port 344 since the second shard 314 (to which the fourth local per-shard order 434 is destined) is pre-assigned to the second mediator port 344.

It is contemplated that the given coordinator port may be configured to transmit a coordinator packet to each mediator port. For example, if the given coordinator port has generated a local-per shard order for a given mediator port, the given coordinator port may transmit a given coordinator packet that comprises the respective local per-shard order to the given mediator port. In another example, if the given coordinator port has not generated a local-per shard order for an other given mediator port, the given coordinator port may transmit an empty coordinator packet to the other given mediator port.

STEP 708: Receiving, by a Given Mediator Port, at Least One Local Per-Shard Order from the Plurality of Coordinator Ports The method 700 continues to step 708 with a given mediator port receiving at least one local per-shard order from a plurality of coordinator ports. For example, the first mediator port 342 receives (i) data indicative of the first local per-shard order 422 destined to the first shard 312 and which is associated with the CID1 and a given value of C1 of the first coordinator port 362 and (ii) data indicative of the third local per-shard order 424 destined to the first shard 312 and which is associated with the CID2 and a given value of C2 of the second coordinator port 364.

It should be noted that each one of the at least one local per-shard order received by the given mediator port may be associated with a coordinator identifier (CID) of the respective coordinator port that transmitted the at least one per-shard order and with a counter of the respective coordinator port that transmitted the at least one per-shard order.

STEP 710: Generating, by the Given Mediator Port, at Least One Centralized Per-Shard Order of Execution The method 700 continues to step 710 with the given mediator port of the step 708 generating at least one centralized per-shard order of execution from the at least one local per-shard order received from the plurality of coordinator ports. For example, the first mediator port 342 may be configured to generate the first centralized per-shard order of execution 502 for the first shard 312 based on inter alia the first local per-shard order 422 and the third local per-shard order 424.

In some embodiments, the first mediator port 342 may be configured to compare the given value of C1 associated with the first local per-shard order 422 and the given value of C2 associated with the third local per-shard order 424 for generating the first centralized per-shard order of execution 502.

In other embodiments, a given mediator port, prior to generating a given centralized per-shard order of execution for a given shard that is pre-assigned thereto, may be configured to verify whether a respective coordinator packet has been received from each one of the plurality of coordinator ports 360 (see FIG. 3).

In further embodiments, a given centralized per-shard order of execution may be transmitted to a respective shard pre-assigned thereto for executing, by the respective pre-assigned shard of the given mediator port, transactions referenced in the respective centralized per-shard order of execution.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A distributed software system for routing transactions for execution, the transactions being generated from a request provided by a request source, the distributed software system comprising:
   a database sub-system comprising a plurality of transaction destination locations and being partitioned into a plurality of shards, each shard of the plurality of shards comprising a respective portion of the plurality of transaction destination locations; and
   a transaction routing sub-system for ordering a plurality of transactions, each one of the plurality of transactions having a respective transaction-unique identifier (TUID) and being destined to at least one respective transaction destination location for execution, the transaction routing sub-system having:
      a plurality of coordinator ports, each one of the plurality of coordinator ports being associated with a respective counter, a given one of the plurality of coordinator ports being configured to:
receive a respective set of transactions, each one of the respective set of transactions having the respective TUID and associated with the at least one respective transaction destination location for execution, the respective counter being indicative of a moment in time when the given one of the plurality of coordinator ports received the respective set of transactions;
for a given shard including at least one transaction destination location associated with the respective set of transactions, determine a local per-shard order of a subset of the set of transactions, transactions of the subset being destined to the at least one transaction destination location of the given shard, the local per-shard order being based on the respective TUIDs of the transactions in the subset of the set of transactions;
a given local per-shard order of the subset of the set of transactions being indicative of an order in which transactions in the subset of the set of transactions are to be executed by the given shard; and
a plurality of mediator ports, each one of the plurality of mediator ports having been pre-assigned to at least one shard; a given one of the plurality of mediator ports being configured to:
receive the local per-shard orders from the plurality of coordinator ports, received local per-shard orders being associated with the at least one shard to which the given one of the plurality of mediator ports is pre-assigned;
determine a centralized per-shard order for the at least one pre-assigned shard by organizing the respective local per-shard orders associated with the at least one pre-assigned shard based on counters of the plurality of coordinator ports of the received respective local per-shard orders;
a given centralized per-shard order being indicative of an order in which all transactions destined to the transactions destination locations of a respective shard and received by the respective mediator port are to be executed by the respective shard, the all transactions destined to the transactions destination locations of the respective shard are to be executed based on the given centralized per-shard order.

2. The system of claim 1, wherein each of the plurality of coordinator ports and each of the plurality of mediator ports is executed as a software module.

3. The system of claim 2, the software module is executed as a State Machine (SM).

4. The system of claim 1, wherein each shard of the plurality of shards is pre-assigned to a single mediator port from the plurality of mediator ports.

5. The system of claim 4, wherein a given mediator port from the plurality of mediator port is pre-assigned with more than one shards from the plurality of shards.

6. The system of claim 1, wherein a given mediator port from the plurality of mediator ports is implemented as part of the respectively pre-assigned shard.

7. The system of claim 1, wherein a given one of the plurality of coordinator ports is configured to send an empty coordinator packet to those ones of the plurality of mediator ports for which the given one of the plurality of coordinator ports has not received transactions.

8. The system of claim 1, wherein a number of the plurality of coordinator ports is smaller than a number of the plurality of mediator ports.

9. The system of claim 8, wherein the number of plurality of mediator ports is smaller than a number of the plurality of shards.

10. The system of claim 1, wherein the database sub-system hosts a database.

11. The system of claim 10, wherein the database is a distributed database and stored in a distributed storage sub-system.

12. The system of claim 10, wherein the database has one or more database tables.

13. The system of claim 12, wherein the one or more database tables are split amongst the plurality of shards.

14. A method for routing transactions for execution, the method being executable by a distributed software system, the distributed software system comprising:
a database sub-system comprising a plurality of transaction destination locations and being partitioned into a plurality of shards, each shard of the plurality of shards comprising a respective portion of the plurality of transaction destination locations;
a transaction routing sub-system for ordering a plurality of transactions, each one of the plurality of transactions having a respective transaction-unique identifier (TUID) and being destined to at least one respective transaction destination location for execution, the transaction routing sub-system having a plurality of coordinator ports and a plurality of mediator ports, each one of the plurality of mediator ports being pre-assigned with at least one respective shard from the plurality of shards;
the method comprising:
receiving, by a given coordinator port, a respective set of transactions, each transaction having a respective TUID and being associated with the at least one respective transaction destination location for execution;
generating, by the given coordinator port, at least one local per-shard order based on the TUIDs and the at least one respective transaction destination location of the transactions in the respective set of transactions, a given one of the at least one local per-shard order comprising transactions from the respective set of transactions that are destined to transaction destination locations of a given shard from the plurality of shards;
transmitting, by the given coordinator port, the at least one local per-shard order to a respective mediator port that is pre-assigned to the given shard from the plurality of shards;
receiving, by a given mediator port, at least one local per-shard order from the plurality of coordinator ports, each one of the at least one local per-shard order received by the given mediator port being associated with an coordinator identifier (CID) of the respective coordinator port and with a counter of the respective coordinator port, the counter of the respective coordinator port being indicative of a moment in time when the respective coordinator port received the respective set of transactions; and
generating, by the given mediator port, at least one centralized per-shard order of execution from the at least one local per-shard order received from the plurality of coordinator ports and based on the respective CIDs and respective counters, the at least one centralized per-shard order of execution being destined to a respective pre-assigned shard of the given mediator port, transactions destined to transaction destination locations of the pre-assigned shard are to be executed based on the at least one centralized per-shard order of execution.

15. The method of claim 14, wherein the method further comprises executing, by the respective pre-assigned shard of the given mediator port, transactions referenced in the respective centralized per-shard order of execution.

16. The method of claim 14, wherein prior to the generating the at least one centralized per-shard order of execution, the method further comprises:
verifying, by the given mediator port, that a coordinator packet has been received from each one of the plurality of coordinator ports.

17. The method of claim 14, wherein the generating the at least one local per-shard order by the given coordinator port comprises:
ordering, by the given coordinator port, the respective set of transactions thereby generating a respective ordered set of transactions.

18. The method of claim 17, wherein the ordering the respective set of translations by the given coordinator port comprises applying an ordering algorithm to the respective TUIDs for generating the at least one local per-shard order by the given coordinator port.

19. The method of claim 14, wherein a number of the plurality of coordinator ports is smaller than a number of the plurality of mediator ports.

20. The method of claim 19, wherein the number of plurality of mediator ports is smaller than a number of the plurality of shards.

21. The method of claim 14, wherein the database sub-system hosts a database.

22. The method of claim 21, wherein the database is a distributed database and stored in a distributed storage sub-system.

23. The method of claim 22, wherein the one or more database tables are split amongst the plurality of shards.

24. The method of claim 21, wherein the database has one or more database tables.

* * * * *